(12) United States Patent
Obuchi

(10) Patent No.: US 7,286,286 B2
(45) Date of Patent: Oct. 23, 2007

(54) STEREO MICROSCOPE

(75) Inventor: Hideki Obuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/874,436

(22) Filed: Jun. 23, 2004

(65) Prior Publication Data

US 2004/0263960 A1 Dec. 30, 2004

(30) Foreign Application Priority Data

Jun. 27, 2003 (JP) ............................. 2003-185221

(51) Int. Cl.
*G02B 21/06* (2006.01)
(52) U.S. Cl. ...................................... 359/385; 359/390
(58) Field of Classification Search ........ 359/385–390, 359/368, 383
See application file for complete search history.

(56) References Cited

U.S. PATENT DOCUMENTS

| 4,606,616 | A | * | 8/1986 | Parker | 359/383 |
| 4,893,223 | A | * | 1/1990 | Arnold | 362/252 |
| 4,906,083 | A | * | 3/1990 | Sattler | 359/386 |
| 5,690,417 | A | * | 11/1997 | Polidor et al. | 362/244 |
| 5,822,053 | A | * | 10/1998 | Thrailkill | 356/237.1 |
| 6,023,368 | A | * | 2/2000 | Woo et al. | 359/387 |
| 6,137,628 | A | * | 10/2000 | Kraft et al. | 359/394 |
| 6,181,471 | B1 | * | 1/2001 | Miyoshi | 359/388 |
| 6,304,375 | B1 | * | 10/2001 | Furuhashi | 359/385 |
| 6,441,958 | B1 | * | 8/2002 | Yeung et al. | 359/372 |
| 6,449,088 | B1 | * | 9/2002 | Pettingell et al. | 359/386 |
| 2003/0090791 | A1 | * | 5/2003 | Dunn | 359/385 |
| 2003/0117701 | A1 | * | 6/2003 | Hanaoka | 359/368 |
| 2003/0137724 | A1 | * | 7/2003 | Tonooka | 359/385 |
| 2004/0066553 | A1 | * | 4/2004 | Gilbert | 359/392 |

FOREIGN PATENT DOCUMENTS

| CA | 2262912 A1 | * | 8/2000 |
| CA | 2441726 A1 | * | 8/2000 |
| JP | 2529884 | | 12/1996 |
| JP | 11-84257 | | 3/1999 |
| JP | 2000-105341 | | 4/2000 |
| JP | 2002-189174 | | 7/2002 |
| JP | 2003075725 A | * | 3/2003 |
| JP | 2003185929 A | * | 7/2003 |

* cited by examiner

*Primary Examiner*—Alessandro Amari
*Assistant Examiner*—Mark Consilvio
(74) *Attorney, Agent, or Firm*—Scully, Scott, Murphy & Presser, P.C.

(57) ABSTRACT

There is disclosed a stereo microscope comprising an illuminating section disposed on a base on which a sample is laid, and constituted by a plurality of light emitting diodes mounted on a planar substrate.

38 Claims, 16 Drawing Sheets

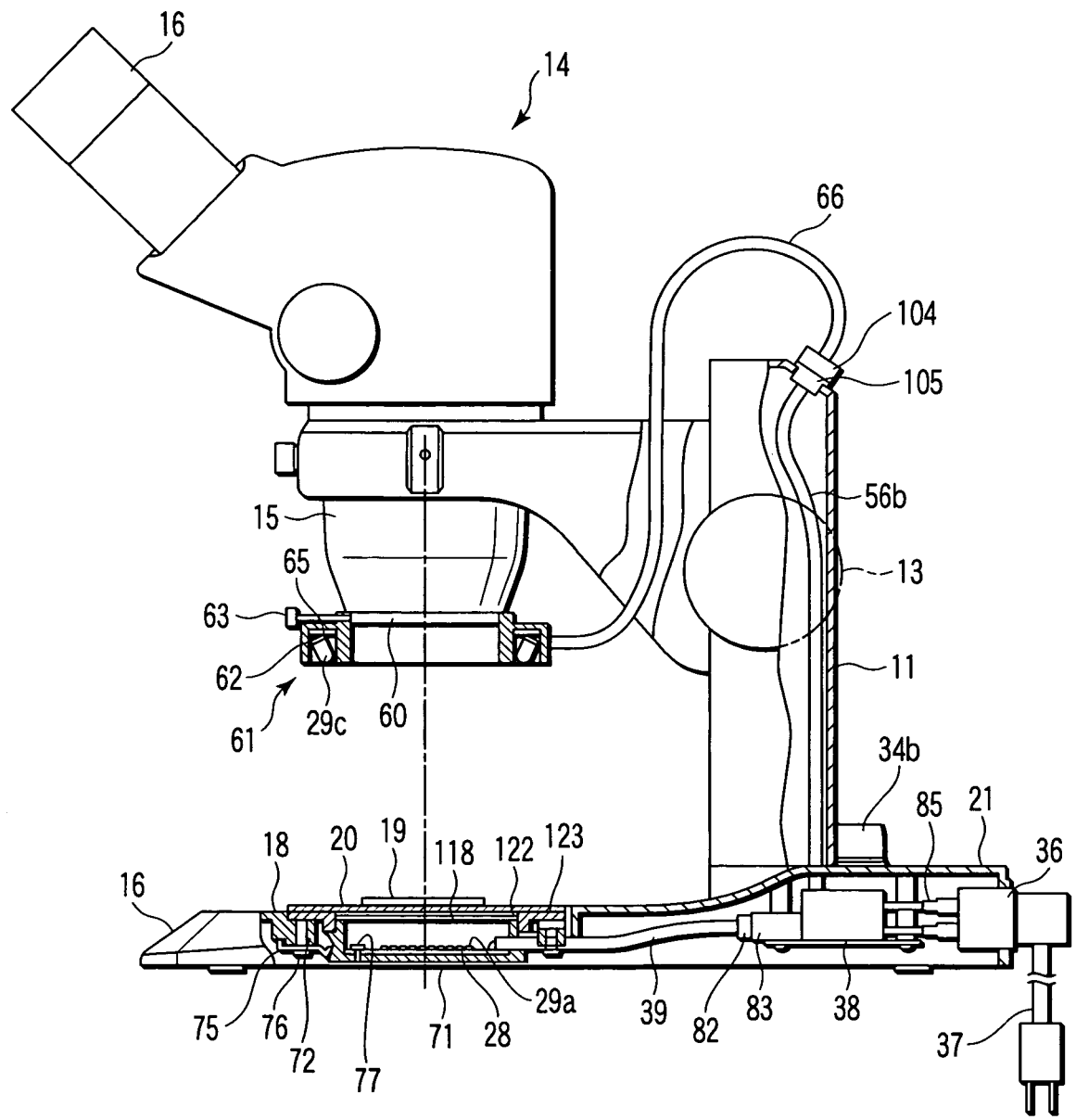
F I G. 10

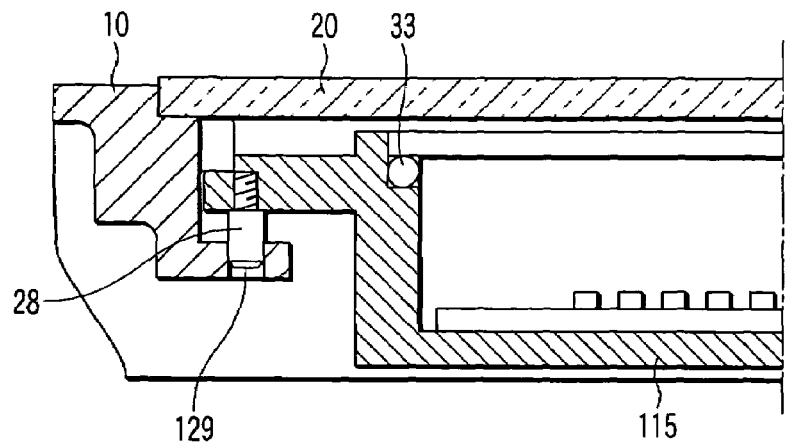
F I G. 14
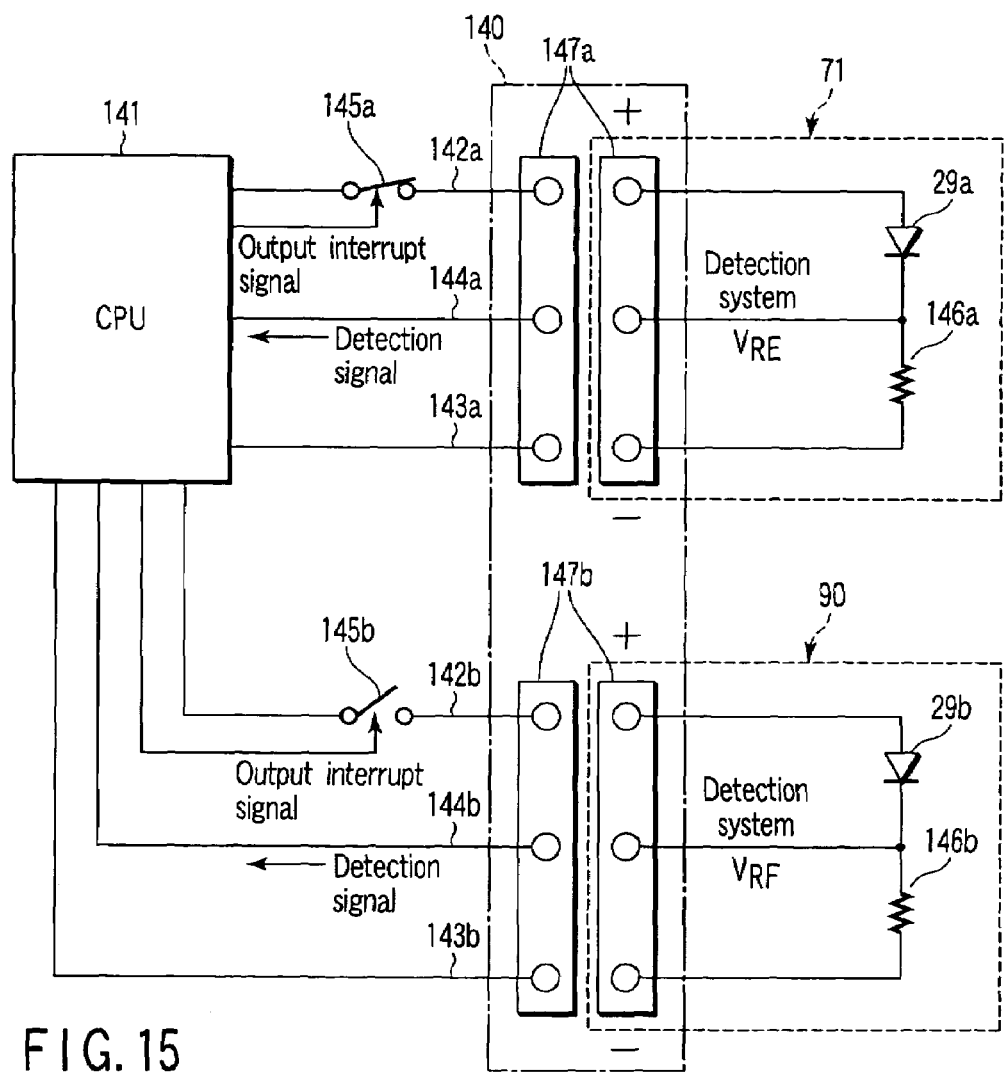
F I G. 15

STEREO MICROSCOPE

CROSS-REFERENCE TO RELATED APPLICATIONS

This application is based upon and claims the benefit of priority from prior Japanese Patent Application No. 2003-185221, filed Jun. 27, 2003, the entire contents of which are incorporated herein by reference.

BACKGROUND OF THE INVENTION

1. Field of the Invention

The present invention relates to a stereo microscope whose stand is made thinner.

2. Description of the Background Art

A stereo microscope is used in performing transmission illumination to observe, for example, a living sample in a living state and in performing operation with respect to the living sample while observing it. The stereo microscope is also used in inspecting and operating a semiconductor device in a semiconductor device manufacturing process.

A transmission illumination device of the stereo microscope is described, for example, in Jpn. Registered UM Publication No. 2529884. In the Jpn. Registered UM Publication No. 2529884, as shown in FIG. 18, it is described that light radiated from a lamp 1 is converged by an optical member 2, directed onto a mirror 3, deflected by the mirror 3 in a vertical direction, and transmitted through a glass stage 4 to irradiate the sample, and the irradiated image of the sample is observed by a microscope main body.

In Jpn. Pat. Appln. KOKAI Publication No. 2000-105341, as shown in FIG. 19, a stand for a microscope is described including a stand base portion 6 having a sample laying surface 5, and a hand rest 7 detachably attached to the stand base portion 6 to surround a portion on which a sample is laid. The hand rest 7 is inclined downwards from the sample laying surface 5, and includes protruding portions 8a, 8b which obliquely protrude in a left/right direction as viewed from an observer. Since the hand rest 7 is disposed, an observer can secure a place for his hand even with a large height to the sample laying surface 5 from a desk upper surface.

In Jpn. Pat. Appln. KOKAI Publication No. 2002-189174, the use of an illuminating portion in which a plurality of light emitting diodes are arranged is described.

BRIEF SUMMARY OF THE INVENTION

According to a main aspect of the present invention, there is provided a stereo microscope comprising: a base on which a sample is laid; a support disposed on the base; an arm section elevatably disposed with respect to the support; a stereo microscope main body detachably attached to the arm section to obtain an observation image of the sample; a focusing mechanism which moves up/down the arm section with respect to the support; and at least one illuminating section in which a plurality of light emitting diodes emitting light fluxes are disposed on a plane to illuminate the sample.

BRIEF DESCRIPTION OF THE SEVERAL VIEWS OF THE DRAWING

FIG. 10 is a constitution diagram in a case where a ring illuminating section is attached to the microscope;

FIG. 14 is a diagram showing rotating/positioning of the illuminating section;

FIG. 15 is a constitution diagram of a power supply control circuit in a sixth embodiment of the stereo microscope according to the present invention;

DETAILED DESCRIPTION OF THE INVENTION

A first embodiment of the present invention will be described hereinafter with reference to the drawings.

Figure 1:
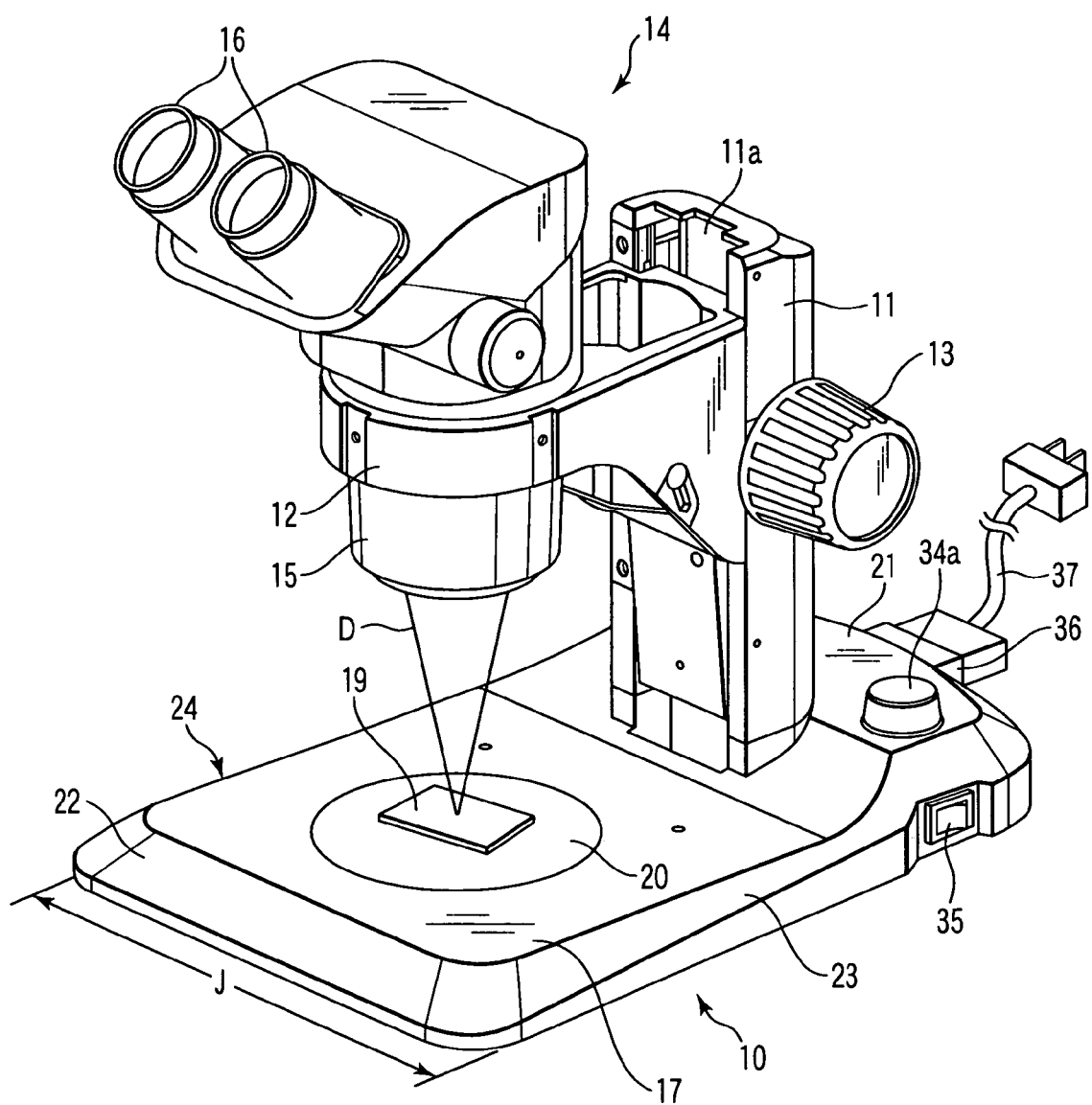
FIG. 1 is an appearance diagram showing a first embodiment of a stereo microscope according to the present invention.
Figure 2:
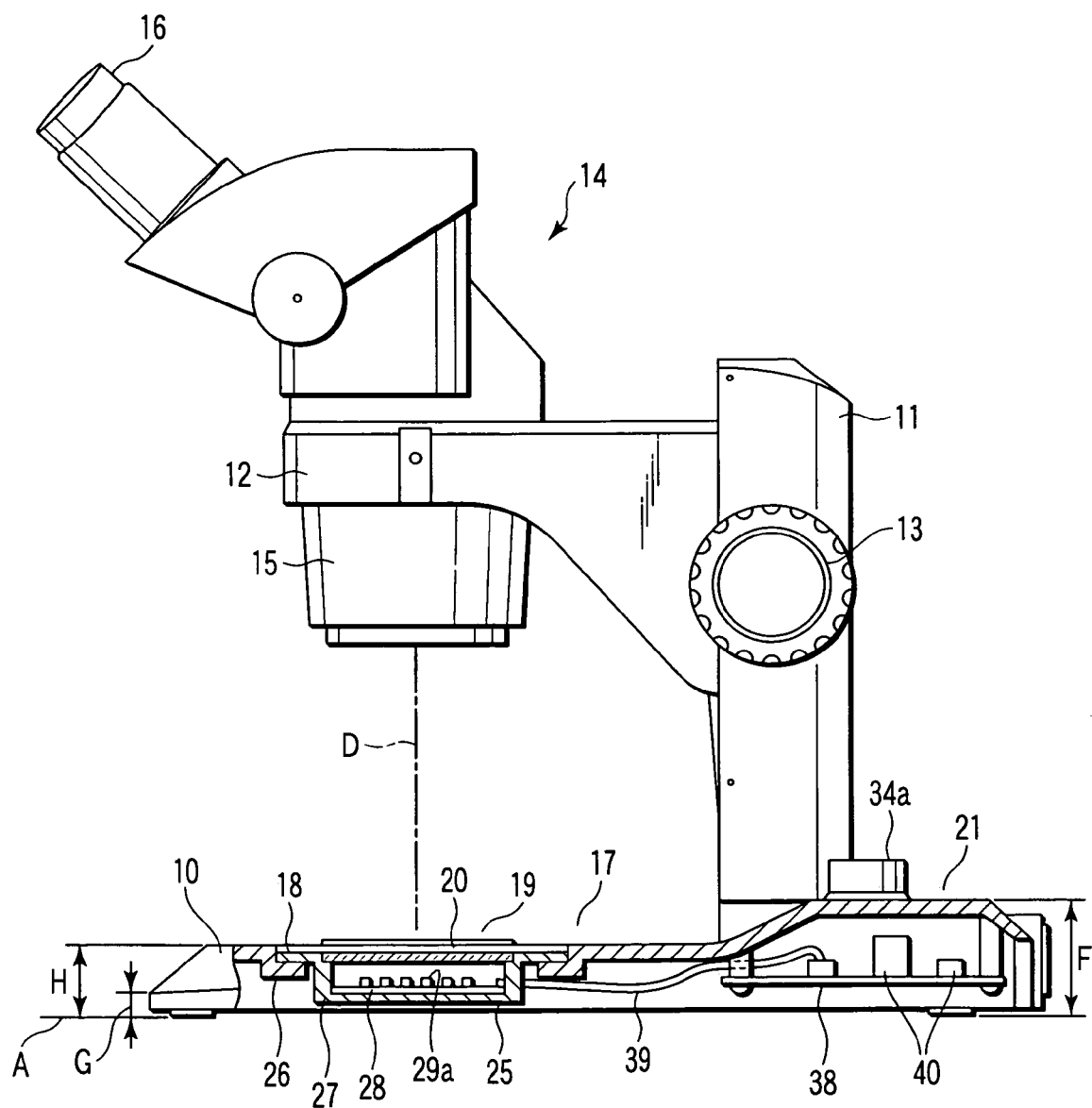
FIG. 2 is a partially sectional view of the microscope.

FIG. 1 is an appearance diagram of a stereo microscope, and FIG. 2 is a side view of the microscope. FIG. 2 is partially a sectional view. A support 11 is attached onto a base 10. An arm section 12 is attached to the support 11 movably in a vertical direction (focusing direction) via a guide mechanism 11a. The support 11 is provided with a focusing handle 13. The focusing handle 13 vertically moves the arm section 12 with respect to the support 11 via the guide mechanism 11a by a rotation operation.

A stereo microscope main body 14 is detachably attached to a tip portion of the arm section 12. An optical observation system is disposed inside the stereo microscope main body 14. The stereo microscope main body 14 comprises a body tube for objective lens 15 in which an objective lens is stored in its lower part, and eyepiece portions 16 in an upper part. The stereo microscope main body 14 includes an optical observation axis D. The optical observation axis D has a pair of angle.

A front side in the base 10 is formed into a flat base thin plate portion 17 having a height H. The optical observation axis D of the stereo microscope main body 14 passes through a middle portion of the base thin plate portion 17.

As shown in FIG. 2, an opening 18 is disposed in the middle portion through which the optical observation axis D passes in the base thin plate portion 17. A glass plate 20 fits and drops into the opening 18. A sample 19 is laid on the glass plate 20.

A base convex portion 21 is formed on a rear side in the base 10, that is, on an attachment side of the support 11. The base convex portion 21 protrudes upwards from the upper surface of the base thin plate portion 17.

Tapered portions 22 to 24 are formed on edge portions on a front-surface side and opposite side-surface sides of the base 10. The tapered portions 22 to 24 are formed in a downward inclined spread toward the edge portion from the upper surface of the base thin plate portion 17.

A first illuminating section 25 is disposed under the glass plate 20 in the base thin plate portion 17. The first illuminating section 25 fits and drops into the opening 18 of the base thin plate portion 17 in the same manner as in the glass plate 20, and is hooked and positioned by a hook portion 26.

Figure 3:
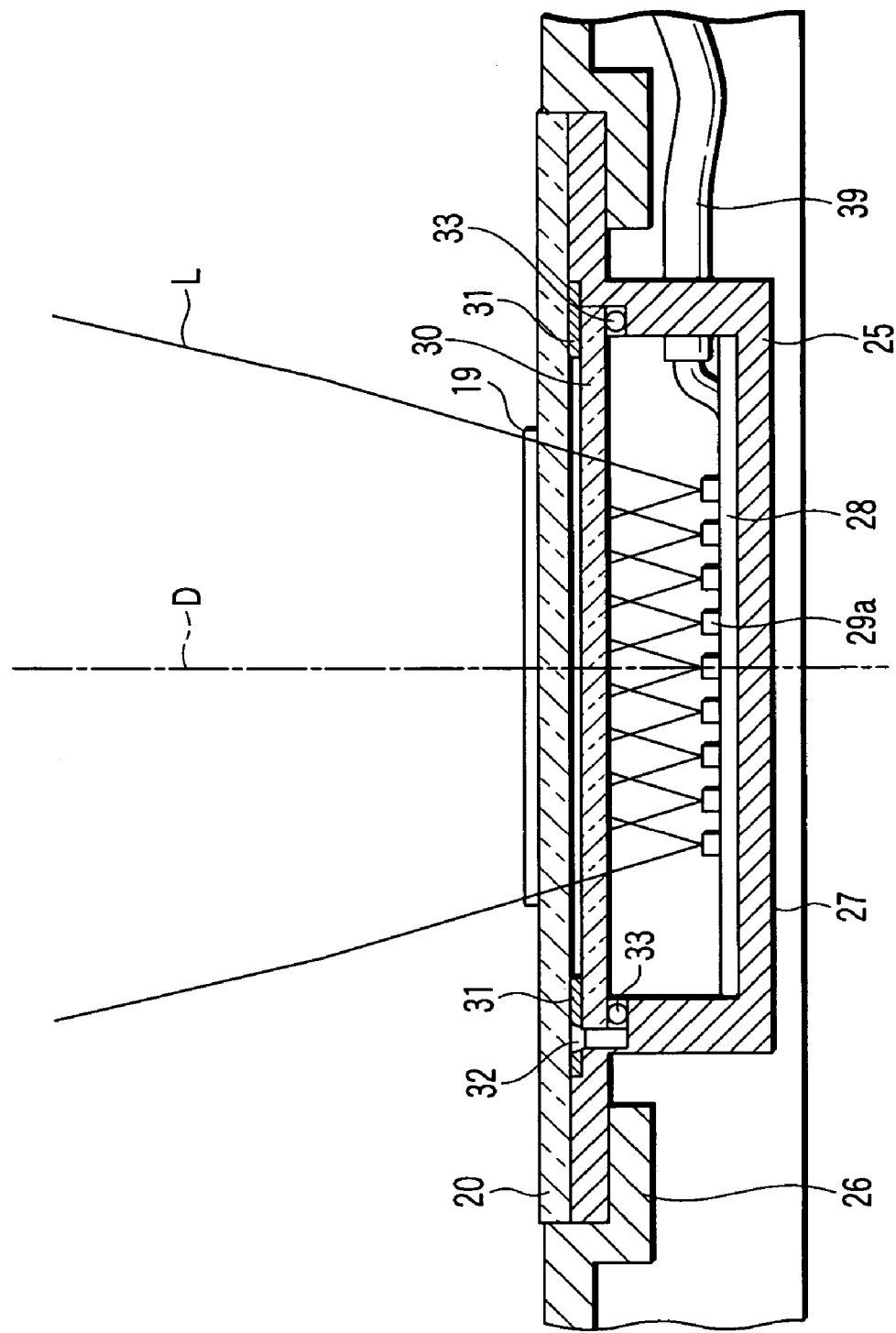
FIG. 3 is a concrete constitution diagram of a first illuminating section in the microscope.

FIG. 3 is a concrete constitution diagram of the first illuminating section 25. The first illuminating section 25 includes a concave frame body 27. The frame body 27 abuts on the hook portion 26 and is held. An illuminating substrate 28 having a flat plate shape is attached into the frame body 27. A plurality of light emitting diodes 29*a* are mounted, for example, in regular positions lengthwise and crosswise on the illuminating substrate 28. For example, a chip type is used in each light emitting diode 29*a*.

A diffusion plate 30 is disposed in an upper part of the frame body 27. The diffusion plate 30 may be a milky white plate, also known as an opal glass. The diffusion plate 30 is held and fixed between the glass plate 20 and the frame body 27 via a stop plate 31 and a screw 32.

An O-ring 33 is held between the frame body 27 and the diffusion plate 30. The O-ring 33 is compressed by the stop plate 31 and screw 32. The diffusion plate 30 is formed in a size having a region larger than a mounting region of the light emitting diode 29*a* mounted on the illuminating substrate 28.

In this manner, the first illuminating section 25 has a constitution in which a plurality of light emitting diodes 29*a* are mounted on the illuminating substrate 28, and may be formed in a thin form. In the base thin plate portion 17 to which the first illuminating section 25 is attached, a height H can be reduced. For example, in the base thin plate portion 17, as shown in FIG. 2, the height H is about 25 mm, a distance G between a desk upper surface A and a taper forming start point of each of the tapered portions 22 to 24 is about 8 mm, a distance F between the desk upper surface A and the upper surface of the base convex portion 21 is about 35 mm, and the maximum width J of the base 10 may be formed in about 240 mm as shown in FIG. 1.

A dimmer 34*a*, 34*b* (the dimmer 34*b* shown in FIG. 5) are attached to the upper surface of the base convex portion 21. The dimmer 34*a*, 34*b* adjusts a total quantity of light in light fluxes emitted from the respective light emitting diodes 29*a*.

A power switch 35 is disposed on the side surface of the base convex portion 21. The power switch 35 projects or interrupts power into each light emitting diode 29*a* disposed in the first illuminating section 25.

An inlet 36 which is a power terminal id disposed on the back surface of the base convex portion 21. The inlet 36 is detachably connected to a power cable 37. Any of the dimmer 34*a*, 34*b*, power switch 35, and inlet 36 may be disposed in the base convex portion 21.

As shown in FIG. 2, a power substrate 38 is attached into the base convex portion 21. The power substrate 38 is connected to the dimmer 34*a*, 34*b*, power switch 35, and inlet 36. The power substrate 38 is connected to the illuminating substrate 28 via a first cable 39 for power supply. Components 40 such as a capacitor and a rectifying device are mounted on the power substrate 38.

Next, a function of the microscope constituted as described above will be described.

The power switch 35 is operated to supply the power. When the power supply is turned on, the power is supplied to the illuminating substrate 28 from the power substrate 38 via the first cable 39. When the power is supplied, the respective light emitting diodes 29*a* mounted on the illuminating substrate 28 emit the light. When the dimmer 34*a*, 34*b* are operated, a resistance value of the dimmer 34*a*, 34*b* changes. Accordingly, when each current value flowing through each light emitting diode 29*a* increases/decreases, a quantity of emission of each light emitting diode 29*a* is adjusted.

Each light flux emitted from each light emitting diode 29*a* passes through the diffusion plate 30 and is diffused. A diffused light from the diffusion plate 30 passes through the glass plate 20 and is applied onto the sample 19.

Light flux L which has passed through the sample 19 passes through the optical observation system disposed in the stereo microscope main body 14, and is guided into the respective eyepiece portions 16. An observation image of the sample 19 is acquired by the respective eyepiece portions 16.

The base thin plate portion 17 of the base 10 is formed in the height H as shown in FIG. 2, and a step from the desk upper surface A is small. The tapered portions 22 to 24 are formed on the base 10. Accordingly, the edge portion of the base thin plate portion 17 is formed in a gently inclined spread. Therefore, to observe the sample 19, an observer can perform operation without being manually caught by corners or the like of the base 10, when laying the sample 19 onto the glass plate 20 from the desk upper surface A.

The observer places his hands, for example, on the respective tapered portions 22 to 24, when moving an observation position with respect to the sample 19 or working the sample 19. The observer's hands can be held at an optimum angle for moving the observation position with respect to the sample 19 or for working the sample 19, and this state can be stably maintained.

In this manner, according to the first embodiment, the thinned base thin plate portion 17 is formed on the front-surface side of the base 10 through which the optical observation axis D of the stereo microscope main body 14 passes, and the first illuminating section 25 including the illuminating substrate 28 on which the respective light emitting diodes 29*a* are mounted is disposed in the base thin plate portion 17.

The base convex portion 21 is formed in a part in the base 10 which does not have to be thinned, that is, on a rear side of the base 10, the dimmer 34*a*, 34*b*, power switch 35, and inlet 36 are disposed on the base convex portion 21, and the power substrate 38 is disposed in the base convex portion 21.

Accordingly, the thickness of the front-surface side of the base 10 can be reduced, and the height to the glass plate 20 from the desk upper surface A can be reduced. Operation property by the observer is enhanced by the thinning of the base 10. For example, an operation for laying the sample 19 on the glass plate 20, and an operation with respect to the sample 19 are facilitated. The sample 19 laid on the desk upper surface A, and the sample 19 mounted on the glass plate 20 can be smoothly replaced. A eye point position of the eye piece portion 16 can be lowered.

The respective tapered portions 22 to 24 are formed on the edge portion of the base 10. Accordingly, the observer can smoothly change the sample 19 without having his hand or the sample 19 caught by the base 10. The observer places his hand on the respective tapered portions 22 to 24, the position of the hand is determined, and the operation with respect to the sample 19 is facilitated.

The O-ring 33 is compressed and held between the frame body 27 in the first illuminating section 25 and the diffusion plate 30. Accordingly, even when water inadvertently overflows on the glass plate 20, water can be prevented from penetrating the first illuminating section 25. By the penetration of water, the illuminating substrate 28 in the first illuminating section 25 can be prevented from trouble. The reliability of the stereo microscope is enhanced.

The base convex portion 21 is disposed on the rear side of the base 10 which is a portion that does not have to be made thin in the base 10, and the power substrate 38 is disposed in the base convex portion 21. Accordingly, the tall components 40 can be mounted on the power substrate 38. The power substrate 38 on which the tall components 40 are mounted is disposed in the base convex portion 21, therefore the thinning of the base thin plate portion 17 can be realized, and the height H to the sample 19 from the desk upper surface A can be reduced.

The dimmer 34a, 34b are attached to the upper surface of the base convex portion 21 which does not have to be made thin. The dimmer 34a, 34b are disposed on the upper surface of the base convex portion 21 having a height larger than that of the base thin plate portion 17. Accordingly, a laboratory dish disposed in the vicinity of the stereo microscope is brought down, for example, at an observation time of the sample 19. Even when water in the laboratory dish overflows, the water which has overflows does not penetrate the base 10 through a gap between the base convex portion 21 and the dimmer 34a, 34b. There has an influence on working by observer.

Since the power substrate 38 is attached into the base convex portion 21, the power supply of the stereo microscope can be integrally constituted. There is not any trouble in assembling the stereo microscope, and the microscope can be easily set up as compared with a case where the stereo microscope is constituted separately from the power supply.

When the chip type is used in the light emitting diode 29a, the base 10 can be made ever thinner, and illumination unevenness can be reduced with respect to the sample 19.

The light emitting diode 29a has a long life, is power-saving, and further has little heating value.

The base thin plate portion 17 is usable as a place where the laboratory dish or the like is placed, when observing the sample 19.

Next, a second embodiment of the present invention will be described with reference to the drawings. It is to be noted that the same parts as those of FIGS. 1 and 2 are denoted with the same reference numerals and detailed description is omitted.

Figure 4:
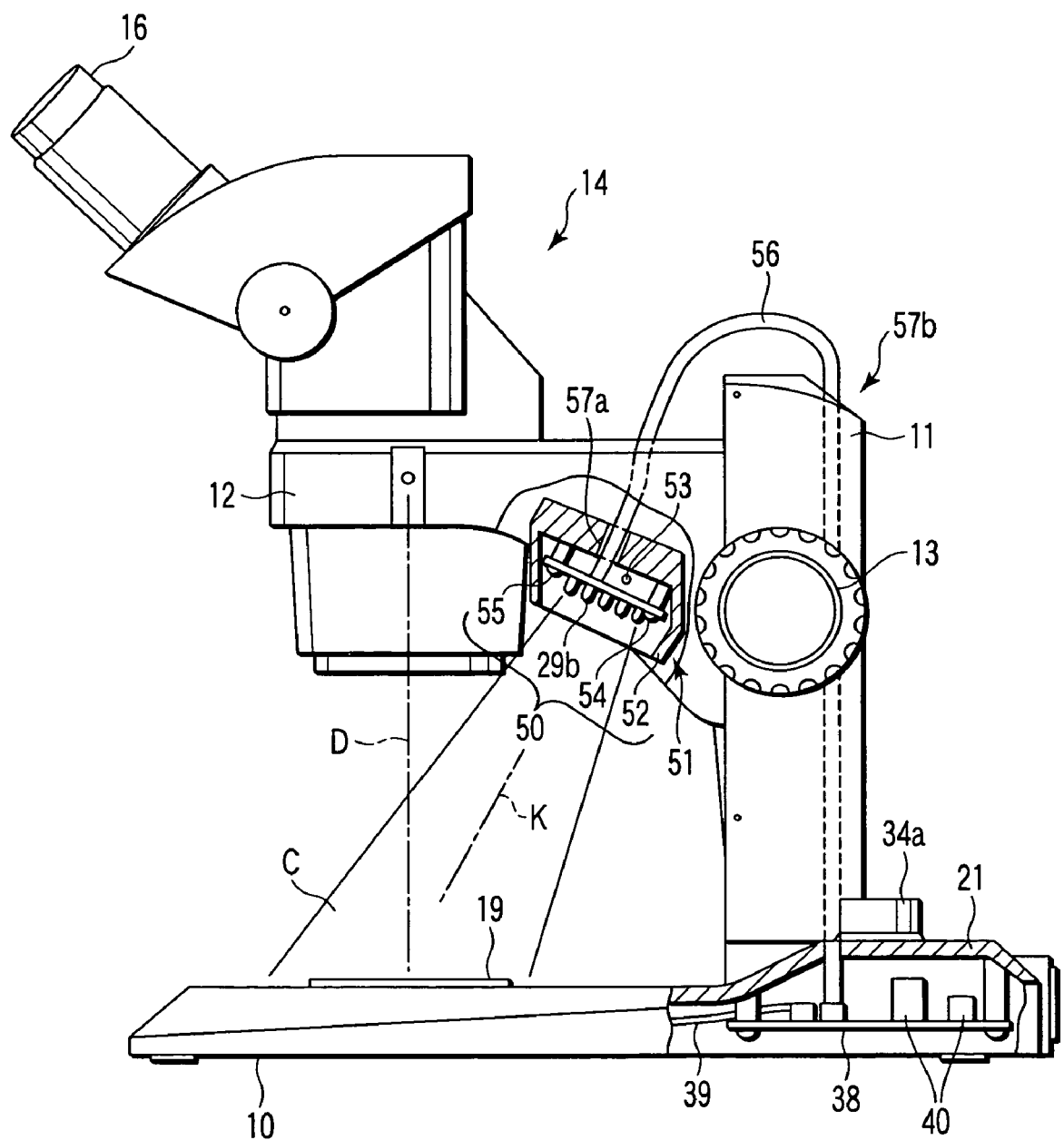
FIG. 4 is a sectional view of a main part showing a second embodiment of the stereo microscope according to the present invention.
Figure 5:
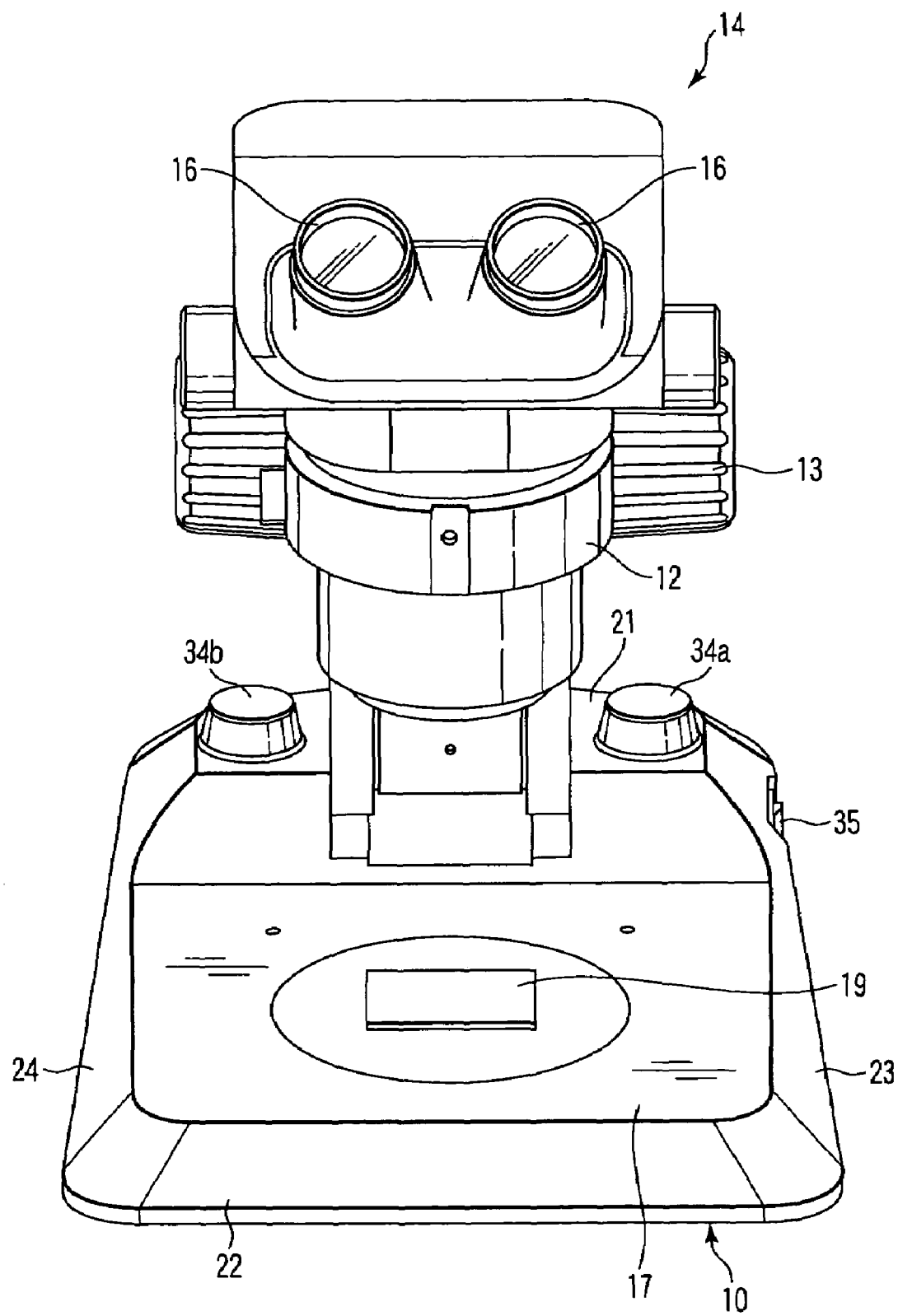
FIG. 5 is an appearance diagram of the microscope viewed from a front surface upper part.

FIG. 4 is a sectional view of a main part of the stereo microscope, and FIG. 5 is an appearance diagram of the microscope viewed from a front surface upper part. The arm section 12 has an arm lower end 50 inclined with respect to a horizontal direction. The arm lower end 50 is disposed between the support 11 and an attaching portion of the stereo microscope main body 14. A second illuminating section 51 is disposed in the arm lower end 50.

The second illuminating section 51 is inclined along the inclined arm lower end 50. The second illuminating section 51 includes a hollowed concave frame body 52. The frame body 52 is fixed to the arm lower end 50 by a screw 53 which is a fixing tool. An illuminating substrate 54 having a flat plate shape is fixed into the frame body 52 by a screw 55.

A plurality of light emitting diodes 29b are mounted in regular positions lengthwise and crosswise on the illuminating substrate 54. A central axis K of a total light flux C radiated from the respective light emitting diodes 29b intersects with the optical observation axis D of the stereo microscope main body on the sample 19.

The back surface of the illuminating substrate 54 is connected to a second cable 56 for supplying the power. A hole portion 57a is formed in a bottom portion of the frame body 52. A vertically long hole portion 57b is formed in the support 11. The second cable 56 is passed through the respective hole portions 57a, 57b and wired in the base convex portion 21. The second cable 56 is connected to the power substrate 38 disposed in the base convex portion 21. The second cable 56 is set to a length to such an extent that a pull is not caused in a range of vertical movement of the arm section 12 at a time when the focusing handle 13 is operated.

The first illuminating section 25 is disposed in the base 10 in the same manner as in the first embodiment. The first illuminating section 25 performs transmission illumination with respect to the sample 19.

Next, the function of the microscope constituted as described above will be described.

When the power switch 35 is turned on, the power is supplied to the illuminating substrate 54 from the power substrate 38 via the second cable 56. The light emitting diodes 29b mounted on the illuminating substrate 54 emit light. When the dimmer 34a, 34b are operated, the resistance value of the dimmer 34a, 34b changes. Accordingly, when each current value flowing through the light emitting diode 29b increases/decreases, the heating value of each light emitting diode 29b is adjusted.

The total light flux C emitted from each light emitting diode 29b is inclined onto the sample 19 obliquely from above. Scattered light reflected by the sample 19 is incident upon the stereo microscope main body 14, passes through the optical observation system disposed in the stereo microscope main body 14, and is guided into each eyepiece portion 16. Accordingly, the observation image of the sample 19 is acquired.

In this manner, according to the second embodiment, the second illuminating section 51 is disposed in the arm lower end 50. Since the second illuminating section 51 illuminates the sample 19 obliquely from above, the scattered light reflected by the sample 19 can be observed in the inclined illumination. Since the dimmer 34a, 34b are operated to adjust the quantity of emission from the respective light emitting diodes 29b of the second illuminating section 51, an optimum quantity of illuminative light can be set for observation of the scattered light reflected by the sample 19.

The transmission illumination by the first illuminating section 25 with respect to the sample 19 can be easily switched to the inclined illumination by the second illuminating section 51. When the transmission illumination is performed simultaneously with the inclined illumination, the observation image of the sample 19 can be observed.

Next, a third embodiment of the present invention will be described with reference to the drawings. It is to be noted that the same parts as those of FIG. 2 are denoted with the same reference numerals, and the detailed description is omitted.

Figure 6:
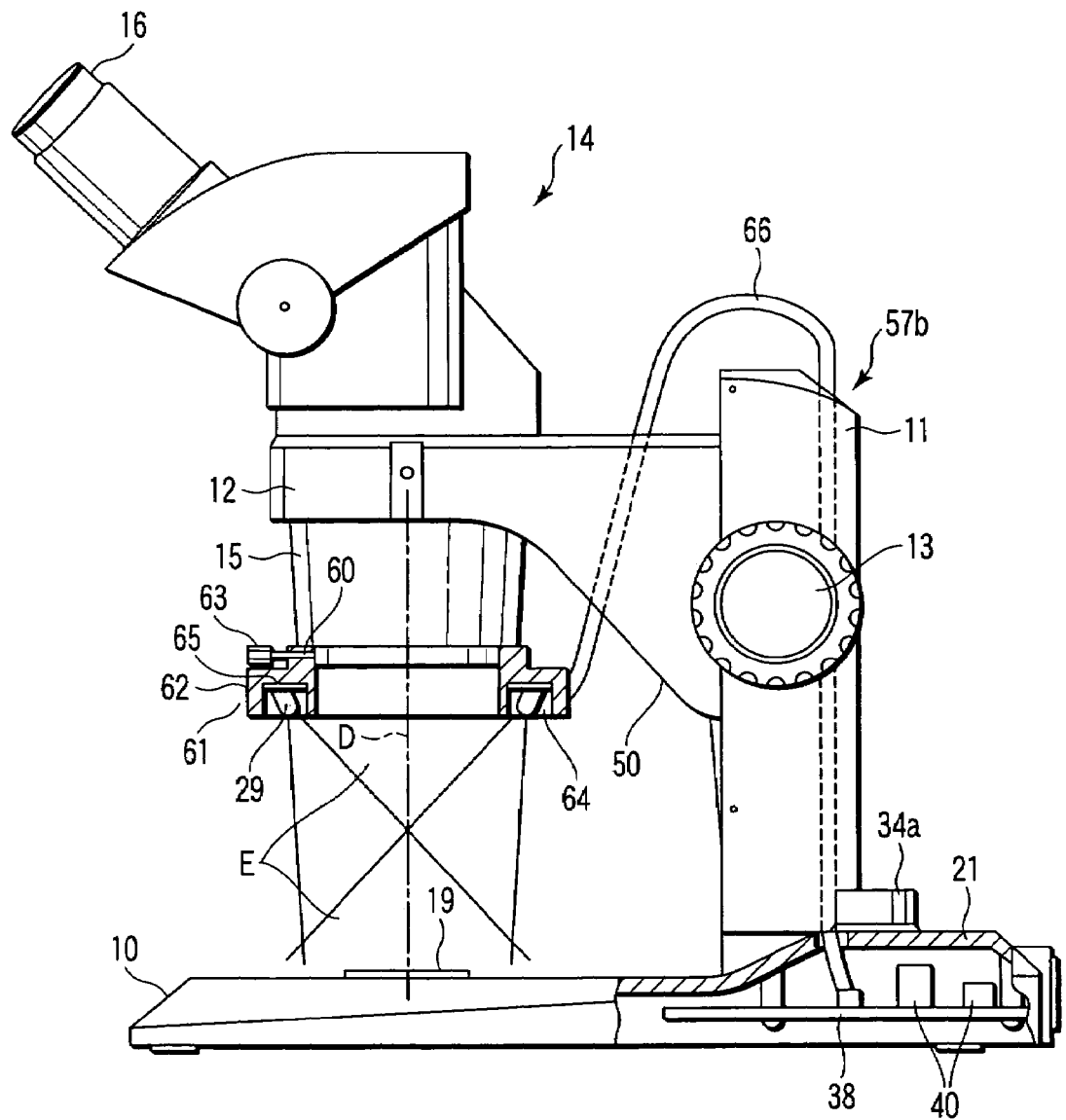
FIG. 6 is a sectional view of a main part showing a third embodiment of the stereo microscope according to the present invention.

FIG. 6 is a sectional view of a main part of the stereo microscope. The stereo microscope main body 14 includes a body tube for objective lens 15. A third illuminating section 61 is attached to a tip portion 60 of the body tube for objective lens 15. The third illuminating section 61 includes a frame body 62 having an annular band shape, which fits into the tip portion 60 of the body tube for objective lens 15. The frame body 62 is fixed to the tip portion 60 of the body tube for objective lens 15 by a stop screw 63. The frame body 62 has a concave portion 64 including an opening in a lower part. An illuminating substrate 65 having an annular band shape is attached into the concave portion 64.

The light emitting diodes 29c are mounted in an annular band shape on the illuminating substrate 65. Each light emitting diode 29c is inclined and mounted facing an optical observation axis D side of the stereo microscope main body 14. The total light flux E radiated from each light emitting diode 29c forms a ring shape. A center of ring illumination corresponds to the optical observation axis D of the stereo microscope main body 14.

The illuminating substrate 65 is connected to a third cable 66. The third cable 66 passes through the hole portion 57b formed in the support 11 to reach the inside of the base convex portion 21. The third cable 66 is connected to the power substrate 38 disposed in the base convex portion 21. The third cable 66 is set to such a length that a pull is not caused in a range of vertical movement of the arm section 12 at a time when the focusing handle 13 is operated.

It is to be noted that the first illuminating section 25 is disposed in the base 10 in the same manner as in the first embodiment. The first illuminating section 25 performs the transmission illumination with respect to the sample 19.

Next, the function of the microscope constituted as described above will be described.

When the power switch 35 is turned on, the power is supplied to the illuminating substrate 65 from the power substrate 38 via the third cable 66. The light emitting diodes 29c mounted on the illuminating substrate 65 emit light. When the dimmer 34a, 34b are operated, the resistance value of the dimmer 34a, 34b changes. Accordingly, when each current value flowing through the light emitting diode 29c increases/decreases, the quantity of emission of each light emitting diode 29c is adjusted.

The annular band shaped total light flux E emitted from each light emitting diode 29c ring-illuminates the sample 19. The scattered light reflected by the sample 19 is incident upon the stereo microscope main body 14, passes through the optical observation system disposed in the stereo microscope main body 14, and is guided into each eyepiece portion 16. Accordingly, the observation image of the sample 19 is acquired.

In this manner, according to the third embodiment, the third illuminating section 61 is disposed in the tip portion 60 of the body tube for objective lens 15, and accordingly ring illumination with respect to the sample 19 is possible. The third embodiment, the reflected scattered light can be observed by the ring-illuminated sample 19.

The transmission illumination by the first illuminating section 25 with respect to the sample 19 can be easily switched to the ring illumination by the third illuminating section 61. When the transmission illumination is performed simultaneously with the ring illumination, the observation sample 19 can be observed.

The second illuminating section 51 shown in FIG. 4 may also be disposed in the arm lower end 50. This can be realized when disposing a connector connecting the second cable 56 from the second illuminating section 51 to the third cable 66 from the third illuminating section 61. The connector is connected to the power substrate 38. Accordingly, the first illuminating section 25, second illuminating section 51, or third illuminating section 61 can be selected. Either or both of the second illuminating section 51 and the third illuminating section 61 may be attached. Therefore, the transmission illumination, inclined illumination, or ring illumination with respect to the sample 19 can be selected.

Next, a fourth embodiment of the present invention will be described with reference to the drawings. It is to be noted that the same parts as those of FIGS. 1 to 4 are denoted with the same reference numerals, and the detailed description is omitted.

Figure 7:
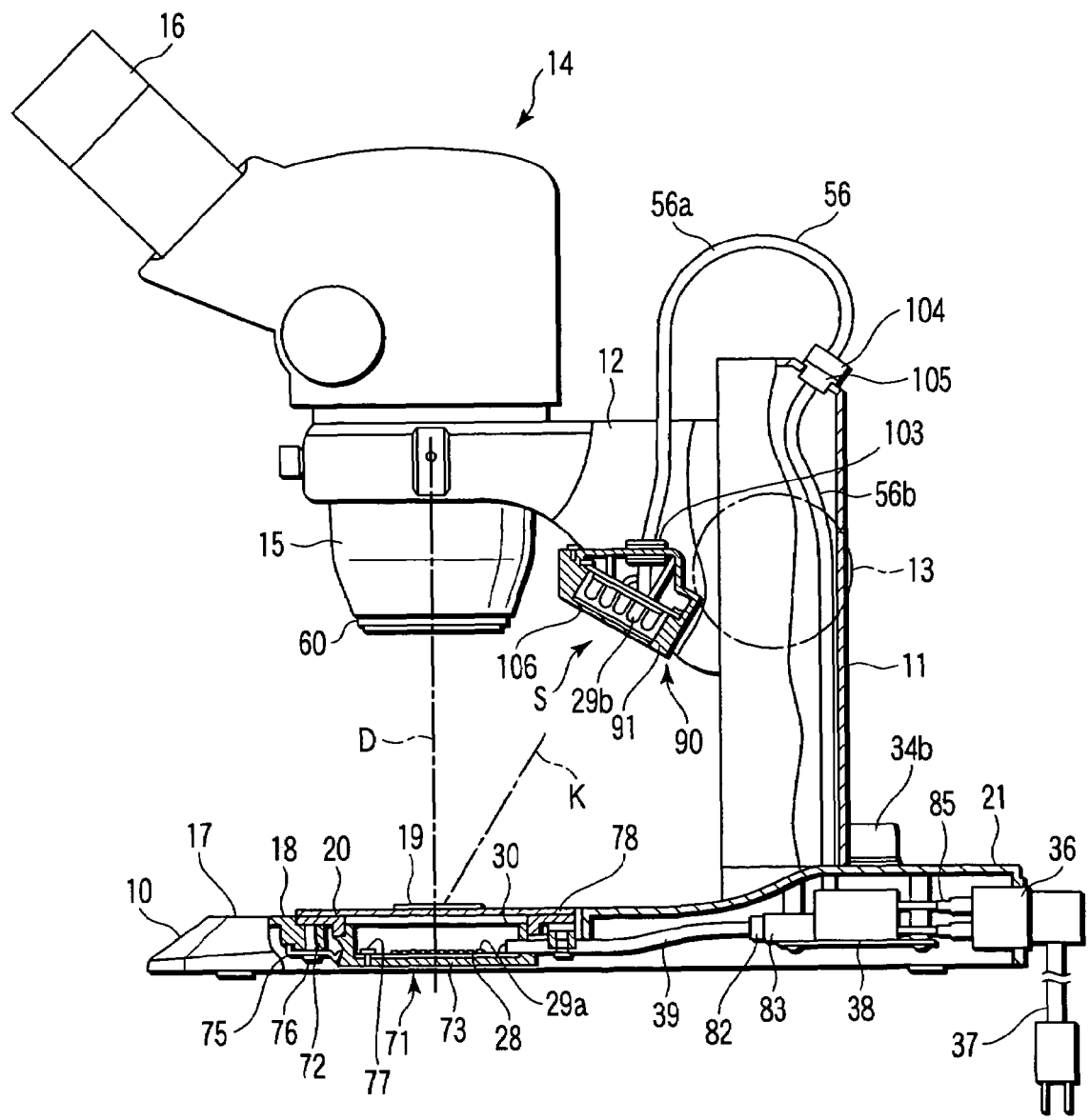
FIG. 7 is a sectional view of a main part showing a fourth embodiment of the stereo microscope according to the present invention.
Figure 8:
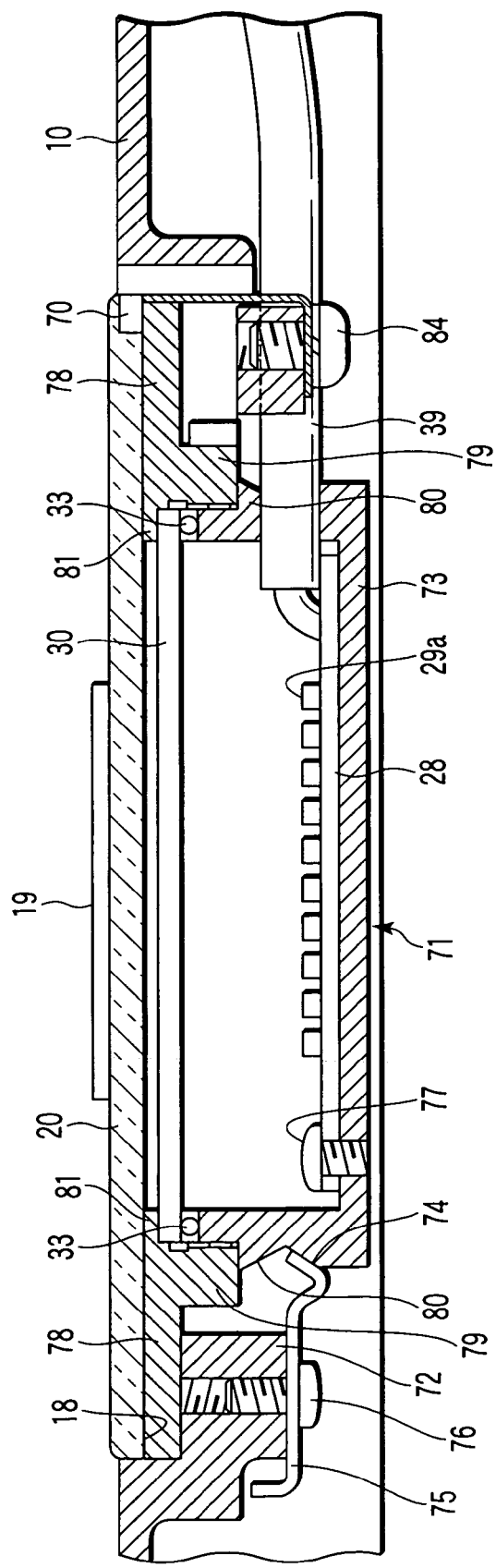
FIG. 8 is a concrete constitution diagram of the illuminating section in the microscope.

FIG. 7 is a sectional view of a main part of the stereo microscope, and FIG. 8 is an enlarged view of the illuminating section. The glass plate 20 fits and drops into the opening 18 in the base thin plate portion 17. The glass plate 20 is held by a leaf spring 70 from an outer peripheral direction as shown in FIG. 8. The leaf spring 70 is fixed below the presser plate 78 in the base 10 by a screw 84.

A first illuminating section 71 is disposed under the glass plate 20. The first illuminating section 71 fits and drops in the opening 18 in the same manner as in the glass plate 20. The first illuminating section 71 is positioned by a hook portion 72.

The first illuminating section 71 includes a concave frame body 73. A tapered groove 74 is disposed in an outer peripheral surface of the concave frame body 73. A fixed plate 75 is pressed, hooked, and fitted in the tapered groove 74. The fixed plate 75 is fixed with respect to the hook portion 72 by a screw 76.

The illuminating substrate 28 having a flat plate shape is fixed into the frame body 73 via a screw 77. A plurality of light emitting diodes 29a are mounted on the surface of the illuminating substrate 28.

A presser plate 78 is disposed on the hook portion 72. The presser plate 78 forms a lower convex portion 79. The lower convex portion 79 engages with an engagement portion 80 of the frame body 73 to press the frame body 73. The presser plate 78 includes a small engagement portion 81 which protrudes on an opening side of the frame body 73. The small engagement portion 81 presses the diffusion plate 30. The O-ring 33 is compressed and held between the small engagement portion 81 and the diffusion plate 30.

The illuminating substrate 28 is connected to the first cable 39. The first cable 39 is detachably connected to a connector portion 83 of the power substrate 38 via a first connector 82. The power substrate 38 is connected to the inlet 36 via a power cable 85.

Figure 9:
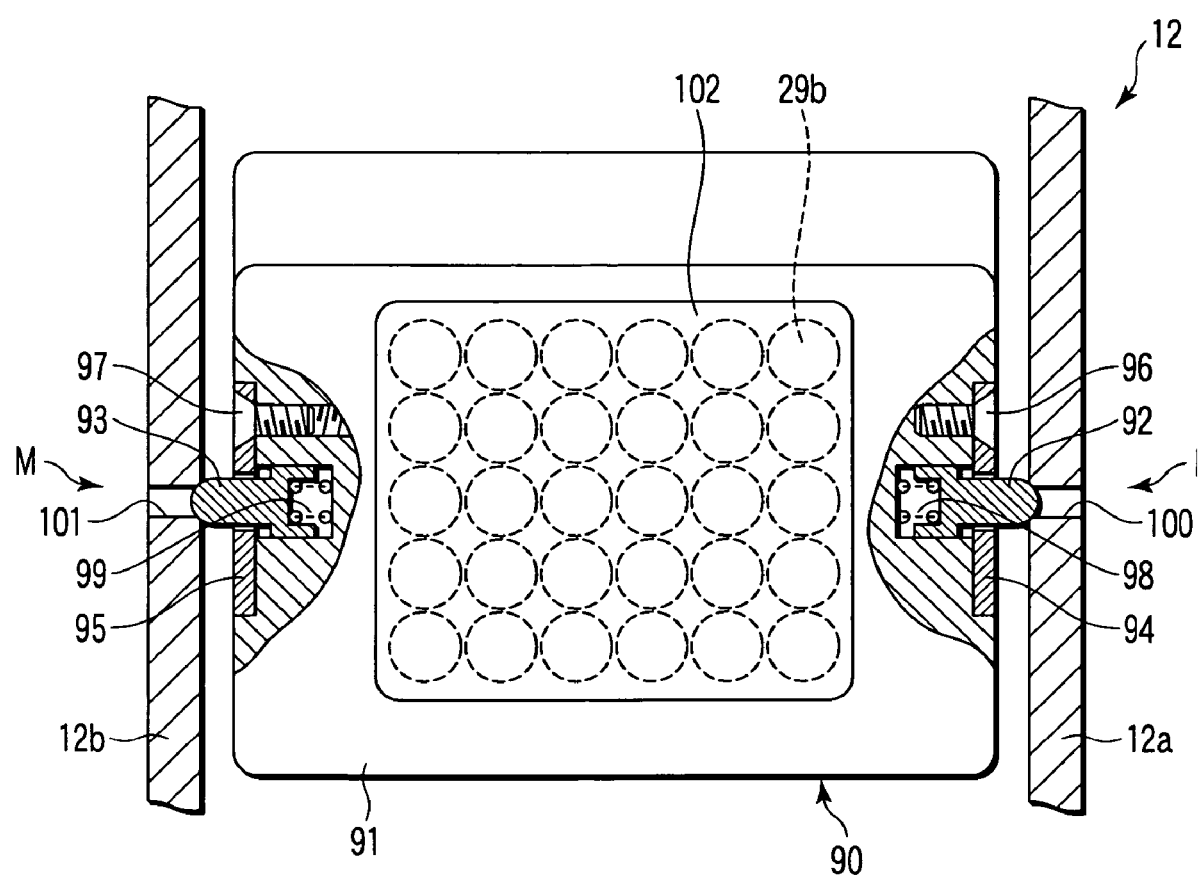
FIG. 9 is a constitution diagram of the illuminating section in the microscope viewed from an arrow direction S.

FIG. 9 is a constitution diagram of a second illuminating section 90 viewed from an arrow direction S in FIG. 3. The arm section 12 includes frames 12a, 12b facing each other. The second illuminating section 90 is disposed between the frames 12a, 12b. The second illuminating section 90 is rotatably disposed between the frames 12a, 12b by a rotation support mechanism M. The rotation support mechanism M rotates the second illuminating section 90 to vary an angle of the inclined illumination with respect to the sample 19.

The second illuminating section 90 includes a frame body 91. The frame body 91 hollowed in a hollow concave shape. Pins 92, 93 which are rotary support members are disposed on opposite sides of the frame body 91 facing each other. The pins 92, 93 are disposed to be prevented from being detached to the outside by cover plates 94, 95. The respective plates 94, 95 are pressed by the frame body 91 via screws 96, 97.

Springs 98, 99 are disposed between base portions of the pins 92, 93 and the frames 12. The respective springs 98, 99 apply pressing urging forces toward tip portion sides of the respective pins 92, 93. The respective frames 12a, 12b are provided with holes 100, 101. The tip portions of the respective pins 92, 93 drop in the respective holes 100, 101 by the urging forces of the respective springs 98, 99, and rotatably hold the frame body 91 with respect to the arm section 12.

An illuminating substrate 102 having a flat plate shape is fixed inside the frame body 91. A plurality of light emitting diodes 29b are regularly mounted lengthwise and crosswise on the illuminating substrate 102. The central axis K of the total light flux C radiated from the respective light emitting diodes 29 intersects with the optical observation axis D of the stereo microscope main body. A diffusion plate 106 is attached on an opening side of the frame body 91. The diffusion plate 106 may be a milky white plate.

The back surface of the illuminating substrate 102 is connected to one end of a second cable 56a. A hole portion 103 is disposed in the back surface of the frame body 91. The second cable 56a passes through the hole portion 103. The other end of the second cable 56a is connected to a second connector 104. A connector 105 is disposed in an upper part of the support 11. The second connector 104 is detachably connected to the connector 105.

The connector 105 is connected to one end of a second cable 56b. The other end of the second cable 56b passes through the support 11 to reach the inside of the base convex portion 21, and is connected to the power substrate 38 disposed in the base convex portion 21. Therefore, the second cable 56a is detachably attached to the second cable 56b via the second connectors 104, 105.

As shown in FIG. 10, the third illuminating section 61 which performs the ring illumination is attachable to the tip portion 60 of the body tube for objective lens 15. The third illuminating section 61 includes the frame body 62 having a annular band shape in the same manner as in the third illuminating section 61 shown in FIG. 6. The frame body 62 having the annular band shape is detachably attached to the tip portion 60 of the body tube for objective lens 15 by the stop screw 63. The illuminating substrate 65 having the annular band shape is disposed in the concave portion 64 of the frame body 62. The light emitting diodes 29c are mounted on the illuminating substrate 65.

The illuminating substrate 65 is connected to the third cable 66. The third cable 66 is connected to the second connector 104. The second connector 104 is detachably connected to the connector 105.

Next, the function of the microscope constituted as described above will be described.

The first illuminating section 71 is detachably attached to the base 10. When the first illuminating section 71 is attached to the base 10, the fixed plate 75 shown in FIG. 8 is fixed by fastening the screw 76. The first connector 82 of the first cable 39 is connected to the connector portion 83. When the first illuminating section 71 is attached to the base 10, the first illuminating section 71 performs the transmission illumination of the sample 19.

When the first illuminating section 71 is detached from the base 10, the fixed plate 75 is detached by looseness of the screw 76. The first connector 82 of the first cable 39 is detached from the connector portion 83.

The second illuminating section 90 is detachably attached to the arm section 12. When the second illuminating section 90 is attached to the arm section 12, the second illuminating section 90 is pushed into the arm section 12. As shown in FIG. 9, the respective pins 92, 93 of the second illuminating section 90 abut on the respective frames 12a, 12b of the arm section 12, and are pushed into the frame body 91. When the respective pins 92, 93 are positioned in the respective holes 100, 101, the respective pins 92, 93 drop in the holes 100, 101 by the urging forces of the springs 98, 99. Accordingly, the second illuminating section 90 is rotatably held in the arm section 12 by the pins 92, 93. The second connector 104 of the second cable 56a is connected to the connector 105 in the upper part of the support 11.

Since the second illuminating section 90 is rotatably held, the illumination is possible even in the stereo microscope having a different working distance by adjustment of the angle of the second illuminating section 90. The second illuminating section 90 performs the inclined illumination with respect to the sample 19.

To detach the second illuminating section 90 from the arm section 12, the second illuminating section 90 is pulled out of the arm section 12. The respective pins 92, 93 are pulled out of the holes 100, 101. Accordingly, the second illuminating section 90 is detached from the arm section 12.

The third illuminating section 61 is detachably attached to the tip portion 60 of the body tube for objective lens 15. When the third illuminating section 61 is attached to the tip portion 60 of the body tube for objective lens 15, the third illuminating section 61 is attached by fastening the stop screw 63 with respect to the tip portion 60 of the body tube for objective lens 15. The second connector 104 of the third cable 66 is connected to the connector 105. The third illuminating section 61 performs the ring illumination of the sample 19.

To detach the third illuminating section 61 from the tip portion 60 of the body tube for objective lens 15, the third illuminating section 61 is detached by loosening the stop screw 63 with respect to the tip portion 60 of the body tube for objective lens 15. The second connector 104 of the third cable 66 is pulled out of the connector 105.

In this manner, according to the fourth embodiment, in addition to the effects of the first to third embodiments, the first illuminating section 71, second illuminating section 90, or third illuminating section 61 can be optionally selected, and is easily detachably attached. Accordingly, the transmission illumination, inclined illumination, or ring illumination can be selected in accordance with an observation purpose of the sample 19. The stereo microscope is superior in system property and cost performance.

Next, a fifth embodiment of the present invention will be described with reference to the drawings. It is to be noted that the same parts as those of FIG. 8 are denoted with the same reference numerals and the detailed description is omitted.

Figure 11:
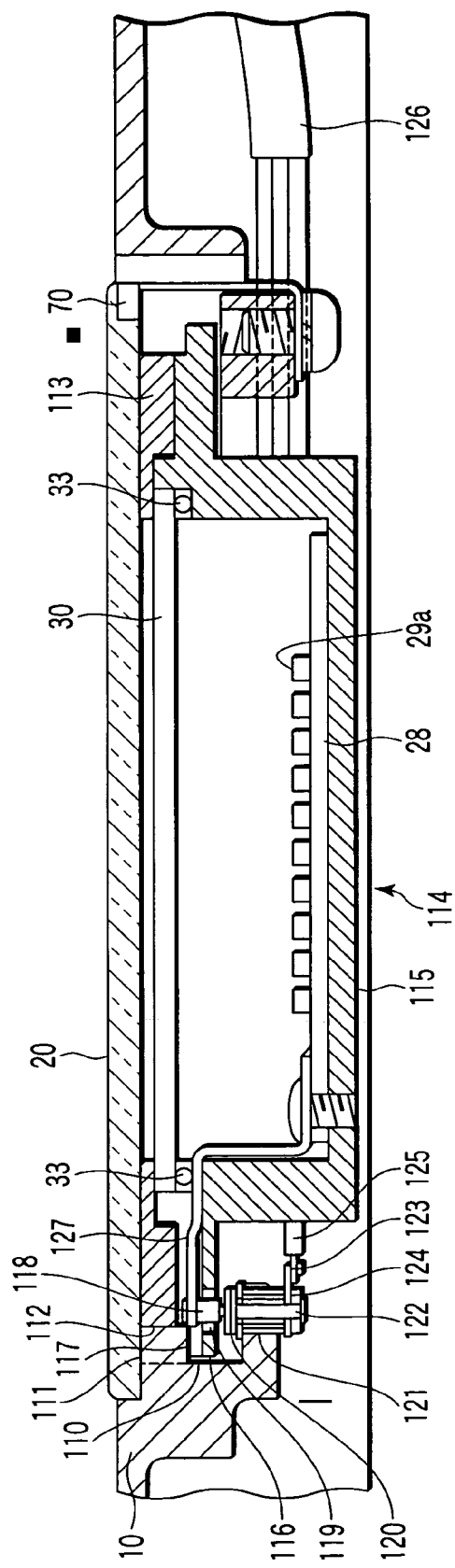
FIG. 11 is a diagram showing an attached state of the illuminating section to a base in a fifth embodiment of the stereo microscope according to the present invention.
Figure 12:
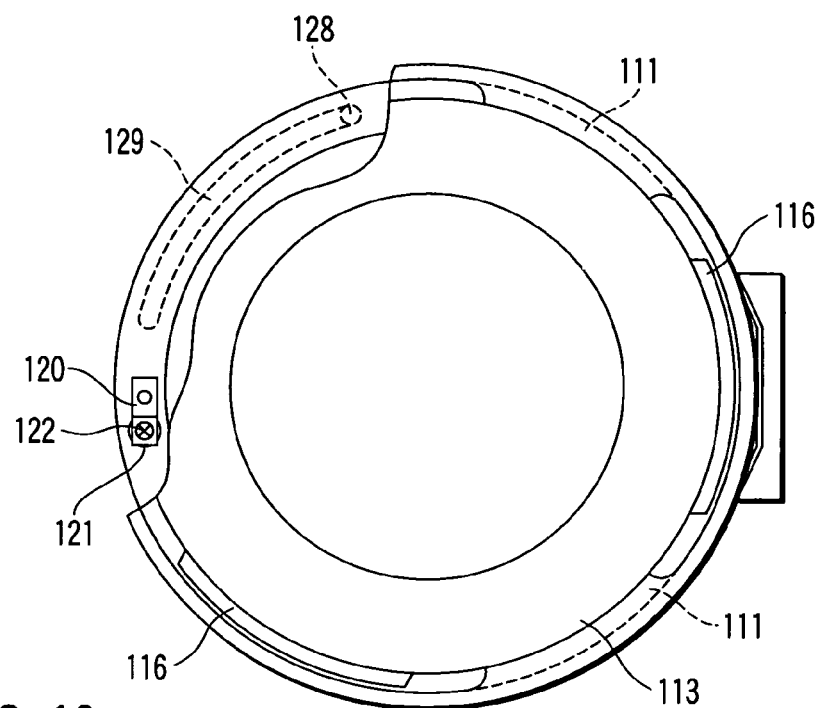
FIG. 12 is a diagram showing an inserted state of the illuminating section into the base.
Figure 13:
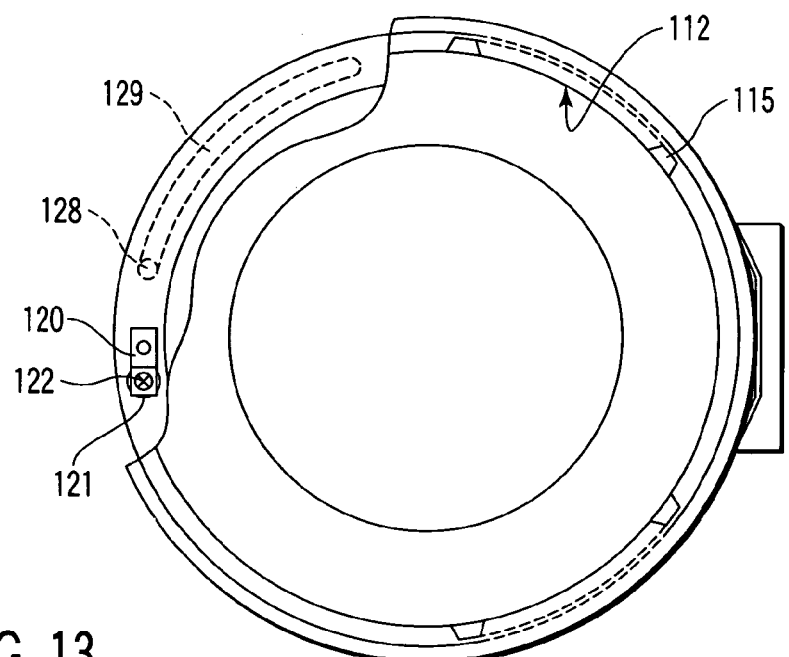
FIG. 13 is a diagram showing a fixed state of the illuminating section to the base.

FIGS. 11 to 14 are diagrams showing an attached state of the illuminating section of the stereo microscope to the base. FIG. 11 is a sectional view, FIG. 12 is a diagram showing an inserted state into the base, FIG. 13 is a diagram showing a fixed state to the base, and FIG. 14 is a diagram showing rotating/positioning.

An opening 110 is disposed in the base 10. The opening 110 is formed in a circular shape. Claw portions 111 are disposed in the opening 110. The claw portions 111 are arranged, for example, at an equal interval obtained by dividing inner periphery in the opening 110 into three. Each claw portion 111 is formed in a predetermined width. The respective claw portions 111 protrude toward a central direction in the opening 110.

A wall 112 in an inner diameter direction of each claw portion 111 fits with an outer diameter of a presser plate 113. The presser plate 113 presses the diffusion plate 30 in the upper part of a frame body 115 of a first illuminating section 114. The diffusion plate 30 may also be a milky white plate. Protrusion upper surfaces 116 are formed on the presser plate 113. The respective protrusion upper surfaces 116 are arranged in positions at equal intervals obtained, for example, by dividing the outer periphery of the frame body 115. Each protrusion upper surface 116 is formed in a predetermined width.

The claw portions 111 are provided with lower walls 117. A contact point 118 protrudes downwards and is attached to the frame body 115 via a resin tube 119, so that the respective lower walls 117 abut on the protrusion upper surfaces 116 of the presser plate 113.

A leaf spring 120 is held and fixed into the base 10 via a resin tube 121 by a screw 122 and a nut 123. Accordingly, the leaf spring 120 pushes the contact point 118 in an upward direction. A plurality of portions including the leaf springs 120 are disposed on the outer periphery of the opening 110.

A terminal 124 is held between the resin tube 121 and the nut 123, The terminal 124 is connected to a cable 125. The cable 125 is connected to the power substrate 38 via a first cable 126 for supplying power.

The contact point 118 is connected to the illuminating substrate 28 via a cable 127. Each claw portion 111 and protrusion upper surface 116 are formed in widths which do not interfere with each other. A guide pin 128 protruding in a downward direction is attached to the underside of the first illuminating section 114.

The base 10 is provided with a groove portion 129. As shown in FIG. 12, the guide pin 128 fits in the groove portion 129. The groove portion 129 is disposed in an angle range from a position where each claw portion 111 does not interfere with the protrusion upper surface 116 in a circumferential direction to a position where the contact point 118 contacts the leaf spring 120 as shown in FIG. 11.

Next, the function of the microscope constituted as described above will be described.

The first illuminating section 114 is detachably attached to the base 10. When the first illuminating section 114 is attached to the base 10, as shown in FIG. 12, each protrusion upper surface 116 is positioned between the claw portions 111. Thereafter, the frame body 115 of the first illuminating section 114 drops into the opening 110.

As shown in FIG. 13, the first illuminating section 114 is rotated. Each protrusion upper surface 116 is moved downwards in each claw portion 111. Accordingly, the rotation of the first illuminating section 114 is regulated in the end portion of the groove portion 129. Moreover, the contact point 118 contacts the leaf spring 120. By the urging force of the leaf spring 120, each of the protrusion upper surfaces 116 is pushed onto the lower walls 117.

When the contact point 118 contacts the leaf spring 120, the illuminating substrate 28 is connected to the power substrate 38 via the first cable 126. Power is supplied to the light emitting diodes 29a mounted on the illuminating substrate 28, and the respective light emitting diodes 29a emit the light.

To detach the first illuminating section 114, the first illuminating section 114 is rotated in a direction reverse to that for attaching the section. The first illuminating section 114 rotates in reverse from the position shown in FIG. 13 to move each protrusion upper surface 116 between the claw portions 111 as shown in FIG. 12. Accordingly, the contact point 118 is detached from the leaf spring 120, and the illuminating substrate 28 is disconnected from the power substrate 38. In this state, the first illuminating section 114 is detached from the opening 110 of the base 10.

According to the fifth embodiment, in addition to the first to fourth embodiments, when the first illuminating section 114 is detachably attached to the base 10, an intricate operation of connecting/disconnecting or turning over the cable is not performed, and the section is easily detachably attached. The constitution is superior in assembling and maintaining properties.

Next, a sixth embodiment of the present invention will be described with reference to the drawings.

FIG. 15 is a constitution diagram of a power supply control circuit which exclusively supplies power to an illuminating section among a plurality of illuminating sections. A power supply control circuit 140 is applied to selection of the first illuminating section 71 and second illuminating section 90 attached to the stereo microscope shown, for example, in FIG. 7.

A CPU 141 is mounted on the power substrate 38. The CPU 141 is connected to output lines 142a, 142b of positive poles (+), output lines 143a, 143b of negative poles (−), and detection lines 144a, 144b of two systems.

The respective output lines 142a, 142b are connected to switches 145a, 145b. The switches 145a, 145b are usually in closed states. The respective switches 145a, 145b are brought into open states by output interruption signals emitted from the CPU 141.

The first illuminating section 71 includes a series circuit comprising the light emitting diode 29a and a detection resistance 146a. The series circuit of the light emitting diode 29a and detection resistance 146a is connected between the output line 142a of the positive pole and the output line 143a of the negative pole. A connection point of the light emitting diode 29a to the detection resistance 146a is connected to the detection line 144a.

The second illuminating section 90 includes a series circuit comprising the light emitting diode 29b and a detection resistance 146b. The series circuit of the light emitting diode 29b and detection resistance 146b is connected between the output line 142b of the positive pole and the output line 143b of the negative pole. A connection point of the light emitting diode 29b to the detection resistance 146b is connected to the detection line 144b.

The respective output lines 142a, 143a, and the detection line 144a between the CPU 141 side and the first illuminating section 71 are connectable/disconnectable via connectors 147a.

The respective output lines 142b, 143b, and the detection line 144b between the CPU 141 side and the second illuminating section 90 are connectable/disconnectable via connectors 147b.

The light emitting diodes 29a, 29b are mounted on the first illuminating section 71 and the second illuminating section 90, but here one light emitting diode 29a, 29b is shown.

Next, an operation of the microscope constituted as described above will be described.

When the first illuminating section 71 is disposed in the stereo microscope, the connectors 147a are connected. The CPU 141 supplies power to the light emitting diodes 29a through the respective output lines 142a, 143a. Accordingly, the light emitting diodes 29a emit the light. Therefore, the first illuminating section 71 performs the transmission illumination of the sample 19.

When current flows through the light emitting diodes 29a and detection resistance 146a, a voltage VRE appearing in the detection resistance 146a is added to the CPU 141 as a detection signal. On detecting the voltage $V_{RE}$, the CPU 141 emits the output interrupt signal to the switch 145b on the second illuminating section 90 side. Accordingly, the switch 145b is brought into the open state. In this state, even when the second illuminating section 90 is connected via the connectors 147b, the power is not supplied to the second illuminating section 90.

When the second illuminating section 90 is disposed in the stereo microscope, the connectors 147b are connected. The CPU 141 supplies power to the light emitting diodes 29b through the respective output lines 142b, 143b. Accordingly, the light emitting diodes 29b emit the light. Therefore, the second illuminating section 90 performs the inclined illumination of the sample 19.

When the current flows through the light emitting diodes 29b and detection resistance 146b, a voltage $V_{RF}$ appearing in the detection resistance 146b is added to the CPU 141 as the detection signal. The CPU 141 emits the output interrupt signal to the switch 145a on the first illuminating section 71 side. Accordingly, the switch 145a is brought into the open state. In this state, even when the first illuminating section 71 is connected via the connectors 147a, the power is not supplied to the first illuminating section 71.

In this manner, according to the sixth embodiment, the power supply control circuit 140 for selecting either the first illuminating section 71 or the second illuminating section 90 is disposed. When the first illuminating section 71 or the second illuminating section 90 is connected, the power can be supplied safely and stably to either the first illuminating section 71 or the second illuminating section 90 without supplying the power to the second illuminating section 90 or the first illuminating section 71.

When an abnormal current flows through the light emitting diode 29a, 29b, the voltage $V_{RE}$ or $V_{RF}$ is added to the CPU 141 as the detection signal in accordance with the abnormal current. The CPU 141 immediately emits the output interrupt signal and is capable of interrupting the power supply to the first illuminating section 71 or the second illuminating section 90.

The power supply control circuit 140 is also applicable to the selection of the first illuminating section 71 or the third illuminating section 61 attached to the stereo microscope shown in FIG. 10.

The power supply control circuit 140 is also applicable to the selection of the second illuminating section 90 or the third illuminating section 61. The power supply control circuit 140 is also applicable to the selection of the first, second or third illuminating section 71, 90, 61.

Next, a seventh embodiment of the present invention will be described with reference to the drawings. It is to be noted that the same parts as those of FIG. 7 are denoted with the same reference numerals, and the detailed description is omitted.

Figure 16:
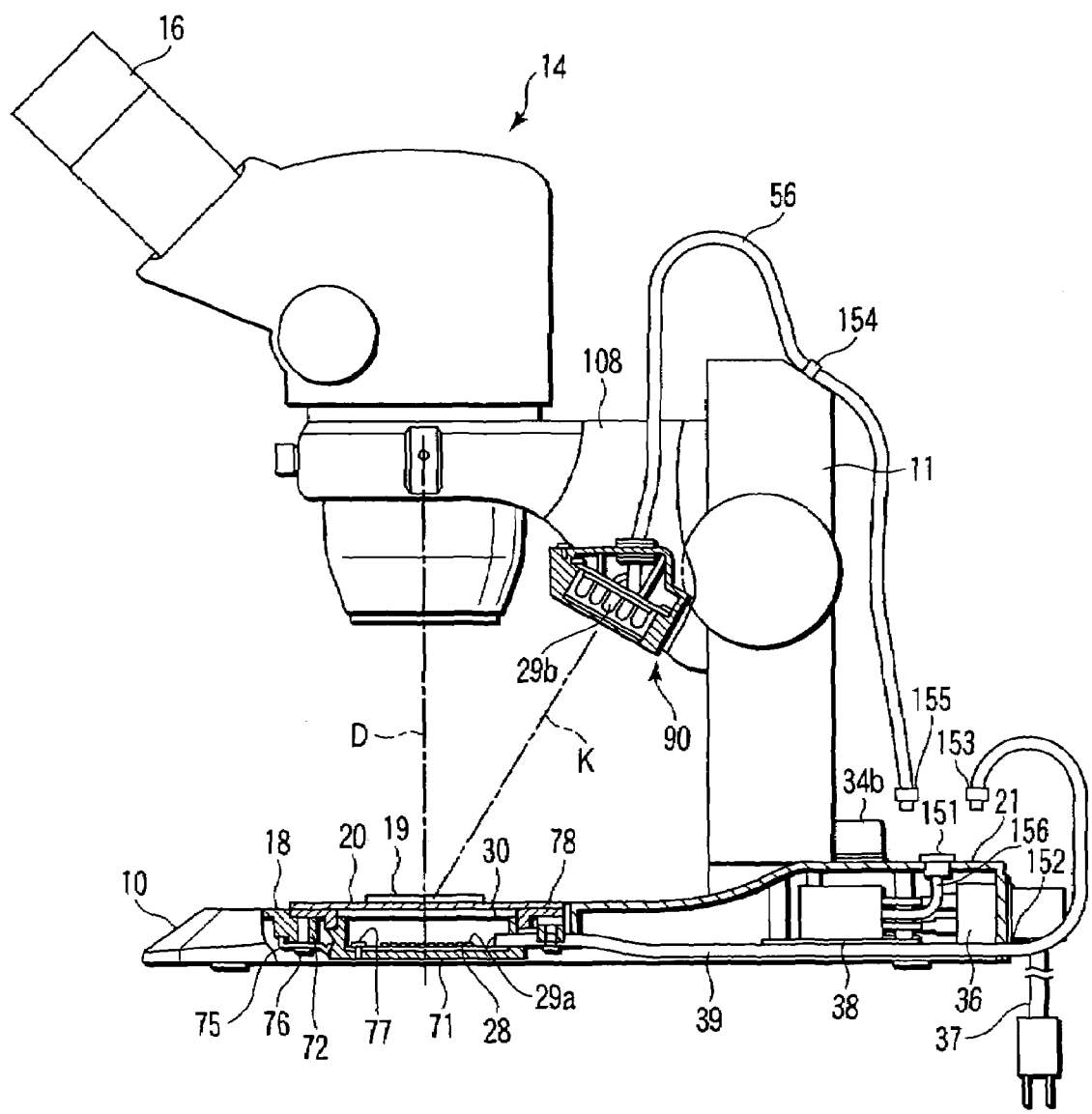
FIG. 16 is a sectional view of a main part showing a seventh embodiment of the stereo microscope according to the present invention.

FIG. 16 is a sectional view showing a main part of the stereo microscope. The power substrate 38 is connected to one end of a power cable 156. The other end of the power cable 156 is connected to a power connector 151. The power connector 151 is exposed to the outside from the upper surface of the base convex portion 21. The power connector 151 is connectable from the outside of the base convex portion 21.

The first illuminating section 71 is connected to the first cable 39. The first cable 39 is disposed in the base convex portion 21. A cutout section 152 is disposed in the rear part of the base convex portion 21. The first cable 39 is derived to the outside of the base convex portion 21 through the cutout section 152. The other end of the first cable 39 is connected to a first connector 153. The first connector 153 is connectable to the power connector 151 on the upper surface of the base convex portion 21.

The second illuminating section 90 is connected to the second cable 56. The second cable 56 is fixed to the support 11 via a bind 154. The other end of the second cable 56 is connected to a second connector 155. The second connector 155 is connectable to the power connector 151 on the upper surface of the base convex portion 21.

The number of light emitting diodes 29a disposed in the first illuminating section 71 is different from that of light emitting diodes 29b disposed in the second illuminating section 90. The number of light emitting diodes 29a disposed in the first illuminating section 71 is larger than that of light emitting diodes 29b disposed in the second illuminating section 90.

Figure 17:
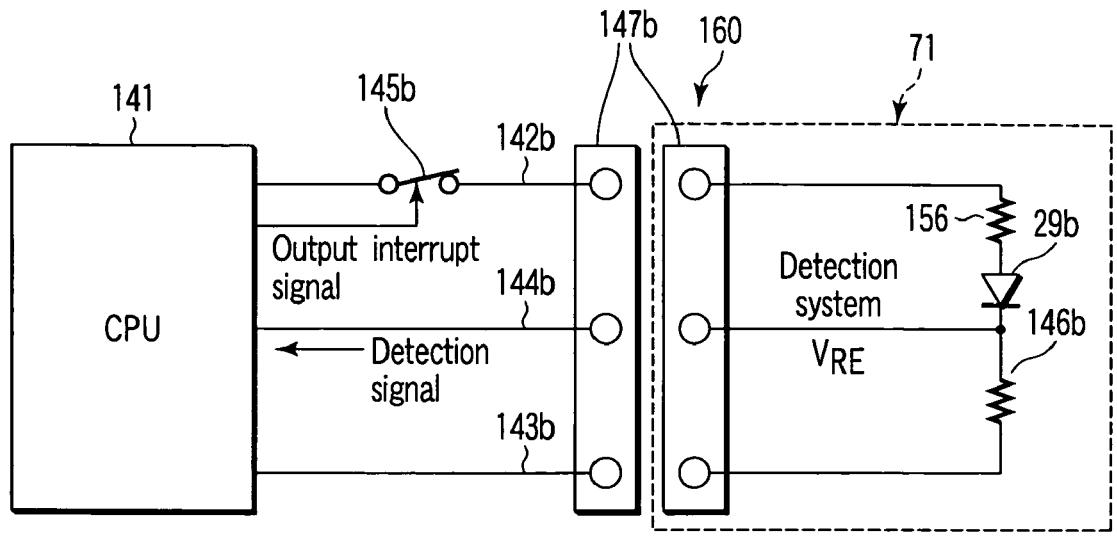
FIG. 17 is a constitution diagram of a current control circuit in the microscope.
Figure 18:
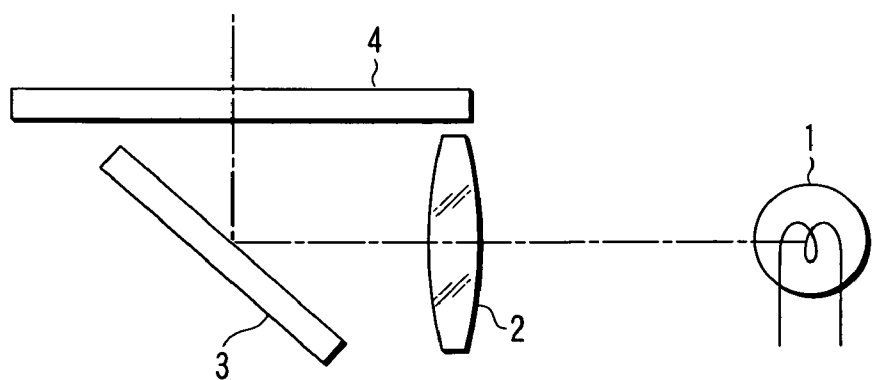
FIG. 18 is a constitution diagram of a transmission illumination device of a conventional stereo microscope.
Figure 19:
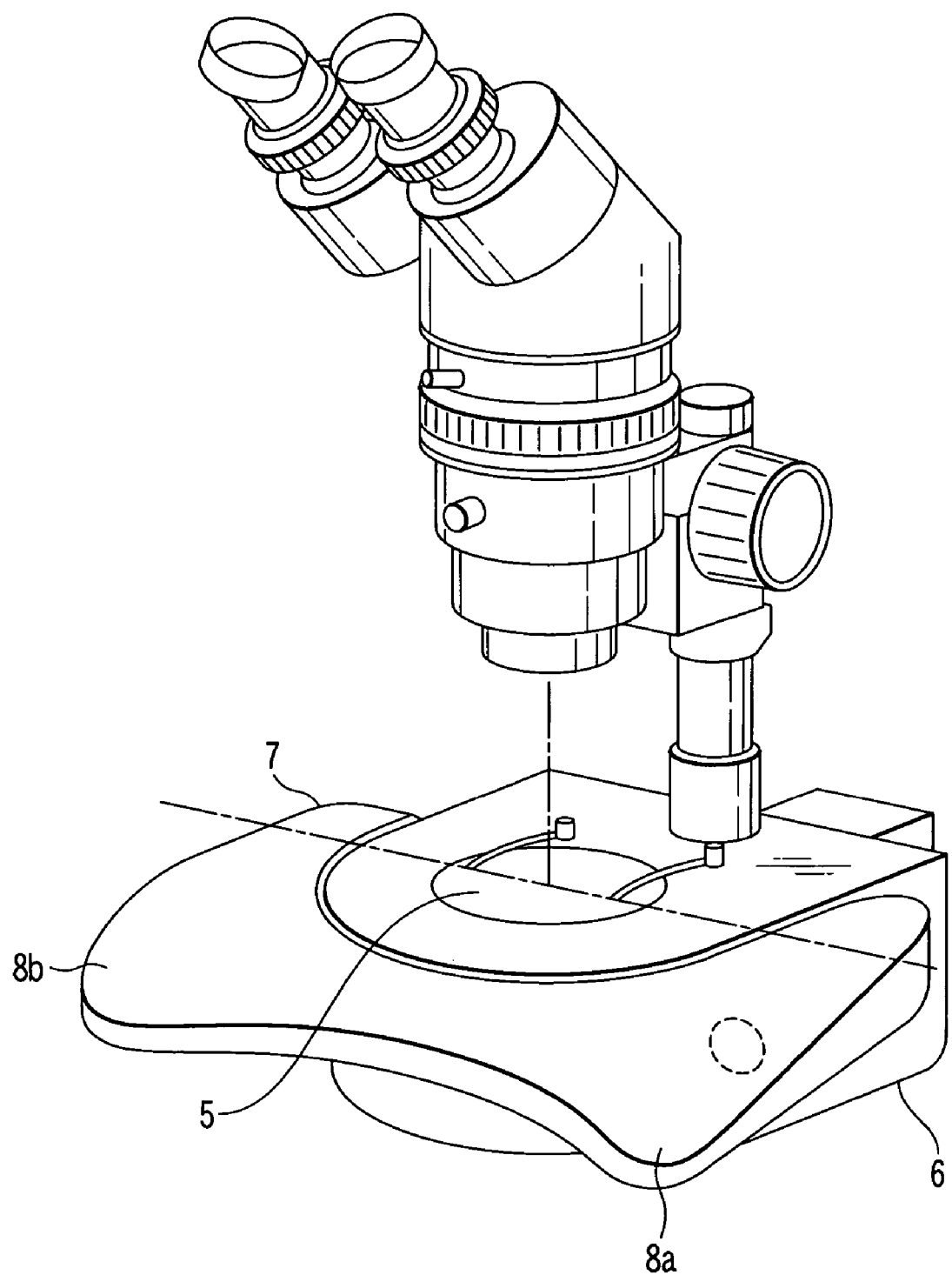
FIG. 19 is a constitution diagram of the transmission illumination device of the conventional stereo microscope.

A current control circuit 160 shown in FIG. 17 is connected to the second illuminating section 90 side. The current control circuit 160 sets the current value flowing through the first illuminating section 71 to be equal to that flowing through the second illuminating section 90. The current control circuit 160 includes the CPU 141. The CPU 141 is connected to the output line 142b of the positive pole (+) and the output line 143b of the negative pole (−) of two systems, and the detection line 144b.

The output line 142b is connected to the switch 145b. The switch 145b is usually brought into the closed state. The switch 145b is brought into the open state by the output interrupt signal emitted from the CPU 141.

The second illuminating section 90 includes the series circuit comprising the light emitting diode 29b, detection resistance 146b, and current limiting resistance 156. The series circuit comprising the light emitting diode 29b, detection resistance 146b, and current limiting resistance 156 is connected between the output line 142b of the positive pole and the output line 143b of the negative pole.

The current limiting resistance 156 is set to a resistance value for setting the current value flowing through each light emitting diode 29b of the second illuminating section 90 to be equal to that flowing through the light emitting diode 29a of the first illuminating section 71. The connection point of each light emitting diode 29b to the detection resistance 146b is connected to the detection line 144b.

Next, the operation of the microscope constituted as described above will be described.

When each light emitting diode 29a of the first illuminating section 71 is allowed to emit the light and the transmission illumination of the sample 19 is performed, the first connector 153 is connected to the power connector 151 on the upper surface of the base convex portion 21.

When each light emitting diode 29b of the second illuminating section 90 is allowed to emit the light and the inclined illumination of the sample 19 is performed, the second connector 155 is connected to the power connector 151 on the upper surface of the base convex portion 21.

When the first connector 153 or the second connector 155 is selectively connected to the power connector 151, the transmission illumination or the inclined illumination can be performed with respect to the sample 19.

In this manner, according to the seventh embodiment, even when the first illuminating section 71 or the second illuminating section 90 having the different number of light emitting diodes 29a, 29b is disposed, the first connector 153 of the first illuminating section 71 or the second connector 155 of the second illuminating section 90 is selectively connected to the power connector 151, and accordingly the transmission illumination or the inclined illumination can be performed with respect to the sample 19.

The current value flowing through the first illuminating section 71 can be set to be equal to that flowing through the second illuminating section 90 by the current control circuit 160. Accordingly, even when the first illuminating section 71 or the second illuminating section 90 is selected, there is no possibility of failure. Since the current control circuit 160 is connected to only the current limiting resistance 156, the circuit is inexpensive and superior in cost performance. The seventh embodiment is possible to connect the third illuminating section 61 and the power connector 151.

The seventh embodiment can be modified as follows.

Two power connectors 151 are disposed. One power connector 151 is for exclusive use in connection of the first connector 153 of the first illuminating section 71. The other power connector 151 is for exclusive use in connection of the second connector 155 of the second illuminating section 90. Accordingly, when the first connector 153 is connected to one power connector 151, and the second connector 155 is connected to the other power connector 151, the transmission illumination is performed simultaneously with the inclined illumination. A number of power connector 151 is possible to be disposed.

One power connector 151 or the other power connector 151 is connected to the switch for switching the power supply, and the transmission illumination and the inclined illumination may be selectively switched. In this case, when the number of light emitting diodes 29a of the first illuminating section 71 is larger than that of light emitting diodes 29b of the second illuminating section 90, the current control circuit 160 controls the current value flowing through the first illuminating section 71 to be equal to that flowing through the second illuminating section 90.

It is to be noted that the present invention is not limited to the above-described embodiments, and may be variously modified.

For example, the light emitting diodes 29a, 29b, 29c may have different emitted colors. The emitted colors of the light emitting diodes 29a, 29b, 29c are, for example, white, red, blue, green. The emitted color of each light emitting diodes 29a, 29b, 29c may also be selected or used, for example, in accordance with industrial or biological observation.

The power substrate 38 is attached inside the base convex portion 21, the dimmer 34a, 34b are disposed on the surface of the base convex portion 21, and the power switch 35 and inlet 36 are disposed on the back surface of the base convex portion 21. The power substrate 38, dimmer 34a, 34b, power switch 35, and inlet 36 may be disposed separately from the stereo microscope.

What is claimed is:

1. A stereo microscope comprising:
    a base which is formed of a first portion having a sample mounting surface on which a sample is laid and a second portion formed to be higher than the height of the sample mounting surface;
    a support disposed between the first portion and second portion of the base;
    an arm section elevatably disposed with respect to the support;
    a stereo microscope main body detachably attached to the arm section to obtain an observation image of the sample;
    a focusing mechanism which moves up/down the arm section with respect to the support;
    a first illuminating section including a light source in which a plurality of light emitting diodes emitting light fluxes are disposed on a plane to transilluminate the sample;
    a second illuminating section which includes a light source in which a plurality of light emitting diodes emitting light fluxes are disposed on a plane, and which is detachably attached to either one of the arm section and an end of the stereo microscope;
    a power substrate which supplies power to the first and second illuminating sections, respectively;
    a glass plate which is disposed on the first portion of the base and on which the sample is laid; and
    a dimmer which is provided on the second portion, and adjusts the amount of light of the first and second illuminating section;
    wherein the first portion is provided so that the sample mounting surface is disposed on a plane of the same height as the height of the glass plate, the second portion houses the power substrate and is formed to be higher than the height of the sample mounting surface, and the dimmer is provided behind the support and on an upper surface of the second portion which is formed higher than the sample mounting surface.

2. The stereo microscope according to claim 1, wherein the illuminating section is disposed selectively in at least one of the base, the arm section, and the tip portion of the stereo microscope main body.

3. The stereo microscope according to claim 1, wherein the illuminating section is detachably attached to at least one of the base, the arm section, and the tip portion of the stereo microscope main body, respectively.

4. The stereo microscope according to claim 3, further comprising:
    a plurality of cables for supplying power, whose one end is connected to the illuminating section; and
    a plurality of connectors connected to the other end of each cable,
    each connector being connectable or disconnectable with respect to a connector for supplying the power.

5. The stereo microscope according to claim 1, wherein the illuminating section is a second illuminating section fixed or detachably attached to the arm section, and
    the second illuminating section includes:
    the respective light emitting diodes;
    a substrate on whose plane the light emitting diodes are mounted;
    a diffusion device which diffuses a light flux emitted from each of the light emitting diodes; and
    a rotary support mechanism which rotatably holds the light emitting diodes, the substrate, and the diffusion device with respect to the inside of the arm section.

6. The stereo microscope according to claim 5, wherein the second illuminating section rotates by the rotary support mechanism to vary an angle of inclined illumination with respect to the sample.

7. The stereo microscope according to claim 5, wherein the rotary support mechanism includes:
    a concave frame body in which the respective light emitting diodes, the substrate, and the diffusion device are disposed; and rotary support members which are disposed on opposite side surfaces of the frame body facing each other and which rotatably hold the frame body with respect to the arm section.

8. The stereo microscope according to claim 7, wherein the rotaty support members include pins disposed on the side surfaces of the frame body facing each other.

9. The stereo microscope according to claim 8, wherein the rotary support members include:
pins disposed on the side surfaces of the frame body facing each other; and
springs which urge the pins toward the outside of the frame body.

10. The stereo microscope according to claim 1, wherein the illuminating section includes a substrate formed in a plane shape, and
the respective light emitting diodes are mounted lengthwise and crosswise on the substrate plane.

11. The stereo microscope according to claim 1, wherein the illuminating section is a first illuminating section fixed or detachably attached to the base, and
the first illuminating section includes:
the light emitting diodes;
a substrate on whose plane the light emitting diodes are mounted; and
a diffusion device which diffuses each light flux emitted from each of the light emitting diodes.

12. The stereo microscope according to claim 11, wherein the first illuminating section includes:
a concave frame body in which the light emitting diodes, the substrate, and the diffusion device are disposed;
a tapered groove disposed in the outer peripheral surface of the frame body;
a fixed plate which fits into the tapered groove; and
a screw which detachably attaches the fixed plate to the base.

13. The stereo microscope according to claim 11, wherein the first illuminating section includes:
a concave frame body in which the light emitting diodes, the substrate, and the diffusion device are disposed;
a plurality of protrusion upper surfaces disposed on an outer peripheral side of the frame body;
an opening which is disposed in the base and into which the frame body drops or is detachable and into which the frame body drops and is rotatable;
a plurality of claw portions which are disposed protruding on an inner diameter side of the opening and which are in plane contact with the protrusion upper surfaces to hold the frame body in the opening;
a cable connected to the substrate;
a contact point connected to the cable;
a leaf spring which is disposed in the base and which is capable of electrically contacting the contact point; and
a cable for supplying power, which is connected to the leaf spring.

14. The stereo microscope according to claim 11, wherein the first illuminating section includes:
a concave frame body in which the substrate is disposed; and
an O-ring which is compressed and held between an upper part of the frame body and the diffusion device and which fixes the diffusion device to the upper part of the frame body.

15. The stereo microscope according to claim 1, wherein the illuminating section is a second illuminating section fixed or detachably attached to the arm section, and
the second illuminating section includes:
the light emitting diodes;
a substrate on whose plane the light emitting diodes are mounted; and
a diffusion device which diffuses each light flux emitted from each of the light emitting diodes.

16. The stereo microscope according to claim 15, wherein the second illuminating section is inclined with respect to a horizontal direction and disposed in a lower end of the arm section, and
a central axis of a total light flux radiated from the respective light emitting diodes intersects with an optical observation axis of the stereo microscope main body on the sample.

17. The stereo microscope according to claim 1, wherein the illuminating section comprises a first illuminating section fixed or detachably attached to the base, and a second illuminating section fixed or detachably attached to the arm section, and includes:
a first substrate on whose plane the light emitting diodes disposed in the first illuminating section are mounted; and
a second substrate on whose plane the light emitting diodes disposed in the second illuminating section are mounted,
a size of the first substrate is formed to be larger than that of the second substrate, and
the number of light emitting diodes mounted on the first substrate is larger than that of light emitting diodes mounted on the second substrate.

18. The stereo microscope according to claim 1, wherein the illuminating section is a second illuminating section fixed or detachably attached to the arm section, and
the second illuminating section includes:
the respective light emitting diodes;
a substrate on whose plane the light emitting diodes are mounted;
a diffusion device which diffuses a light flux emitted from each of the light emitting diodes;
a concave frame body in which the respective light emitting diodes, the substrate, and the diffusion device are disposed; and
a fixing tool which fixes the frame body to the arm section.

19. The stereo microscope according to claim 1, wherein the illuminating section is a third illuminating section fixed or detachably attached to the tip portion of the stereo microscope main body,
the third illuminating section includes an annular band shaped frame body disposed on the tip portion of the stereo microscope main body,
the light emitting diodes are inclined with respect to the optical observation axis of the stereo microscope main body and are mounted in an annular band shape along the annular band shaped frame body on the annular band shaped frame body, and
light fluxes emitted from the plurality of light emitting diodes are applied onto the stereo microscope main body including a focusing position.

20. The stereo microscope according to claim 19, wherein the annular band shaped frame body is fixed to the tip portion of the stereo microscope main body by a stop screw.

21. The stereo microscope according to claim 19, wherein the annular band shaped frame body detachably fits with respect to the tip portion of the stereo microscope main body and is fixed to the tip portion by fastening a stop screw and is detached from the tip portion by loosening the stop screw.

22. The stereo microscope according to claim 1, wherein the illuminating section is a first illuminating section fixed or detachably attached to the base, and the first illuminating section performs transmission illumination of the sample.

23. The stereo microscope according to claim 1, wherein the illuminating section is a second illuminating section fixed or detachably attached to the arm section, and the second illuminating section performs inclined illumination of the sample.

24. The stereo microscope according to claim 1, wherein the illuminating section is a third illuminating section fixed or detachably attached to the tip portion of the stereo microscope main body, and the third illuminating section performs ring illumination of the sample.

25. The stereo microscope according to claim 1, wherein the support is provided between the first portion and the second portion.

26. The stereo microscope according to claim 1, further comprising:

a first cable which connects the power substrate and the first illuminating section to supply power; and a second cable which connects the power substrate and the second illuminating section to supply power, wherein the second cable is introduced into an inner space of the support.

27. The stereo microscope according to claim 1, wherein the second portion includes at least one of: a dimmer which adjusts a quantity of light emitted from the light emitting diodes; a power switch which projects or interrupts power to the illuminating section; and a power terminal via which a power cable for supplying power to the illuminating section through the power switch is detachably attached.

28. The stereo microscope according to claim 27, wherein the dimmer is disposed on the upper surface of the second portion, the power switch is disposed on the side surface of the second portion, and the power terminal is disposed on the back surface of the second portion.

29. The stereo microscope according to claim 1, wherein the illuminating sections are disposed in at least two of the base, the arm section, and the tip portion of the stereo microscope main body, and are simultaneously lit or any one of the illuminating sections is lit to illuminate the sample.

30. The stereo microscope according to claim 1, wherein the illuminating sections are disposed in at least two of the base, the arm section, and the tip portion of the stereo microscope main body, and a power supply control circuit turns on one of the illuminating sections disposed in two places and turns off the other illuminating section.

31. The stereo microscope according to claim 30, wherein the power supply control circuit detects an abnormal current flowing through the light emitting diodes, and interrupts the power supply to the illuminating sections.

32. The stereo microscope according to claim 1, wherein the illuminating sections are disposed in at least two of the base, the arm section, and the tip portion of the stereo microscope main body, and a current control circuit supplies currents having equal values to the illuminating sections disposed in two places.

33. The stereo microscope according to claim 32, wherein the current control circuit controls the currents flowing through the illuminating sections to a current value flowing through the illuminating section requiring a largest current value among currents which need to be passed through the illuminating sections.

34. The stereo microscope according to claim 32, wherein the illuminating sections include:

a first illuminating section disposed with respect to the base; and a second illuminating section disposed with respect to the arm section, the number of light emitting diodes disposed in the first illuminating section is larger than that of light emitting diodes disposed in the second illuminating section, and the current control circuit controls the current value flowing through the illuminating section disposed on the base to be equal to that flowing through the illuminating section disposed on the arm section.

35. The stereo microscope according to claim 1, wherein the illuminating sections include at least one of a first illuminating section fixed or detachably attached to the base, a second illuminating section fixed or detachably attached to the arm section, and a third illuminating section fixed or detachably attached to the tip portion of the stereo microscope main body, and further include:

a first cable for supplying power, which is connected to the first illuminating section;

a first connector disposed on the first cable;

a second cable for supplying power, which is connected to the second illuminating section;

a second connector disposed on the second cable;

a third cable for supplying power, which is connected to the third illuminating section;

a third connector disposed on the third cable;

a power substrate which is disposed in the base and which supplies the power to any one of the first, second, and third illuminating sections;

a power cable connected to the power substrate; and a power connector which is connected to the power cable and which is disposed on the surface of the base connected or disconnected with respect to the first, second, or third connector.

36. The stereo microscope according to claim 1, wherein a plurality of light emitting diodes have a chip type.

37. The stereo microscope according to claim 1, wherein a plurality of light emitting diodes emit different emitted colors.

38. The stereo microscope according to claim 1, wherein a plurality of light emitting diodes have emitted colors of white, red, blue and green.

* * * * *